United States Patent
Su

(10) Patent No.: US 10,313,089 B2
(45) Date of Patent: Jun. 4, 2019

(54) METHOD, APPARATUS, AND SYSTEM FOR TRANSMITTING DATA IN ETHERNET

(71) Applicant: HUAWEI TECHNOLOGIES CO., LTD., Shenzhen (CN)

(72) Inventor: Wei Su, Amsterdam (NL)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 150 days.

(21) Appl. No.: 14/861,248

(22) Filed: Sep. 22, 2015

(65) Prior Publication Data
US 2016/0013922 A1    Jan. 14, 2016

Related U.S. Application Data

(63) Continuation of application No. PCT/CN2013/073502, filed on Mar. 29, 2013.

(51) Int. Cl.
*H04L 5/00*  (2006.01)
*H04L 12/931*  (2013.01)
(Continued)

(52) U.S. Cl.
CPC ........ *H04L 5/0094* (2013.01); *H04L 12/4633* (2013.01); *H04L 49/35* (2013.01); *H04L 2012/6421* (2013.01)

(58) Field of Classification Search
None
See application file for complete search history.

(56) References Cited

U.S. PATENT DOCUMENTS

2006/0056335 A1    3/2006  Lin et al.
2007/0234172 A1*  10/2007  Chiabrera ............ H04L 1/0043
                                                       714/752
(Continued)

FOREIGN PATENT DOCUMENTS

CN    101399811    4/2009
CN    101686175    3/2010
(Continued)

OTHER PUBLICATIONS

Partial Supplementary European Search Report dated Dec. 10, 2015 in corresponding European Patent Application No. 13880685.6.
(Continued)

*Primary Examiner* — Chi H Pham
*Assistant Examiner* — Vladislav Y Agureyev
(74) *Attorney, Agent, or Firm* — Staas & Halsey LLP

(57) ABSTRACT

Embodiments of the present invention provide a method, an apparatus, and a system for transmitting data in the Ethernet, and relate to the field of Ethernet communications, so as to reduce the complexity of data processing while achieving transmission of high-rate data. The method includes: receiving to-be-transmitted data; determining a first integral number according to a data amount of the received to-be-transmitted data and a transmission bandwidth of an electrophysical sub-channel; distributing the to-be-transmitted data to a first integral number of electrophysical sub-channels; performing, by the first integral number of electrophysical sub-channels, coding and scrambling processing on the to-be-transmitted data; and sending after processing, by a second integral number of photophysical sub-channels, data from the first integral number of electrophysical sub-channels.

27 Claims, 12 Drawing Sheets

(51) Int. Cl.
    *H04L 12/46*        (2006.01)
    *H04L 12/64*        (2006.01)

(56)            References Cited

U.S. PATENT DOCUMENTS

| | | | | |
|---|---|---|---|---|
| 2008/0095189 | A1* | 4/2008  | Frazier    | H04L 69/14 370/469 |
| 2008/0138075 | A1* | 6/2008  | Gustlin    | H04L 47/10 398/115 |
| 2008/0285981 | A1* | 11/2008 | Diab       | H04L 12/2805 398/154 |
| 2010/0202556 | A1* | 8/2010  | Chiabrera  | H04L 25/14 375/295 |
| 2010/0220599 | A1* | 9/2010  | Ding       | H04L 47/34 370/241.1 |
| 2010/0284486 | A1  | 11/2010 | Kuwata     | |
| 2011/0170861 | A1* | 7/2011  | Ding       | H04J 3/1658 398/25 |
| 2011/0191656 | A1* | 8/2011  | Bliss      | H03M 13/05 714/776 |
| 2012/0155486 | A1* | 6/2012  | Ahn        | H04L 5/1423 370/433 |
| 2013/0235884 | A1* | 9/2013  | Mamidwar   | H04L 5/0044 370/468 |
| 2013/0343761 | A1* | 12/2013 | Fang       | H04Q 11/0067 398/115 |
| 2014/0010539 | A1* | 1/2014  | Varanese   | H04J 3/1694 398/66 |
| 2014/0016637 | A1* | 1/2014  | Masood     | H04L 12/4013 370/390 |
| 2014/0161141 | A1* | 6/2014  | Lusted     | H04L 12/12 370/468 |
| 2014/0199070 | A1* | 7/2014  | Shellhammer | H04L 5/0046 398/66 |

FOREIGN PATENT DOCUMENTS

| | | |
|---|---|---|
| EP | 2 075 937 A2    | 7/2009 |
| WO | 2006/028695 A2  | 3/2006 |
| WO | 2012/163430 A1  | 12/2012 |

OTHER PUBLICATIONS

PCT International Search Report dated Jan. 2, 2014 in corresponding International Patent Application No. PCT/CN2013/073502.
"IEEE P802.3ba™D3.2 Draft Standard for Information technology—Telecommunications and information exchange between systems—Local and metropolitan area networks—Specific requirements Part 3: Carrier Sense Multiple Access with Collision Detection (CSMA/CD) Access Method and Physical Layer Specifications", IEEE P802.3ba™/D3.2, Mar. 24, 2010, pp. 1-461.
International Search Report dated Jan. 2, 2014, in corresponding International Application No. PCT/CN2013/073502.

* cited by examiner

METHOD, APPARATUS, AND SYSTEM FOR TRANSMITTING DATA IN ETHERNET

CROSS-REFERENCE TO RELATED APPLICATIONS

This application is a continuation of International Application No. PCT/CN2013/073502, filed on Mar. 29, 2013, which is hereby incorporated by reference in its entirety.

TECHNICAL FIELD

The present invention relates to the field of Ethernet communications, and in particular, to a method, an apparatus, and a system for transmitting data in the Ethernet.

BACKGROUND

As technologies advance, a transmission rate of the Ethernet has risen from 10 M, 100 M, 1 G and 10 G to 40 G and 100 G Currently, the 40 G and 100 G Ethernets have been widely used. With rapid development of new services such as IP (Internet Protocol, Internet Protocol) video and cloud calculating, service traffic on a network grows rapidly and a requirement of the services for a high bandwidth becomes urgent, which drive the Ethernet to evolve to a higher rate.

To make the Ethernet evolve to a higher rate, the Ethernet develops in the direction of higher order modulation and a PIC (Photonic Integrated Circuit, photonic integrated circuit) in the prior art. By using a higher order modulation scheme, a communication rate of a single channel can be improved.

However, the prior art has at least the following disadvantage: as the rate of the Ethernet is gradually increased, when data is processed by using an existing physical layer architecture of the Ethernet, bit width processing is usually performed, which increases the complexity of data processing. In addition, the number of used virtual channels grows rapidly as the rate of the Ethernet is increased, which further increases the complexity of data processing.

SUMMARY

Embodiments of the present invention provide a method, an apparatus, and a system for transmitting data in the Ethernet, so as to reduce the complexity of data processing while meeting high-rate data transmission.

In order to achieve the foregoing objectives, the embodiments of the present invention adopt the following technical solutions.

According to a first aspect, an embodiment of the present invention provides a method for transmitting data in the Ethernet, which includes: receiving to-be-transmitted data; determining a first integral number according to a data amount of the received to-be-transmitted data and a transmission bandwidth of an electrophysical sub-channel, where the first integral number is the number of the electrophysical sub-channels configured to transmit the to-be-transmitted data, the electrophysical sub-channel is configured to implement a function of a physical coding sublayer PCS in the Ethernet, and the first integral number is greater than zero; distributing the to-be-transmitted data to a first integral number of electrophysical sub-channels; performing, by the first integral number of electrophysical sub-channels, coding and scrambling on the to-be-transmitted data; and sending after processing, by a second integral number of photophysical sub-channels, data from the first integral number of electrophysical sub-channels, where the photophysical sub-channel is configured to implement a function of a physical medium attachment sublayer PMA in the Ethernet and a function of a physical medium dependent sublayer PMD in the Ethernet, and the second integral number is greater than zero.

In a first possible implementation manner of the first aspect, the receiving to-be-transmitted data specifically includes: receiving, by a reconciliation sublayer RS in the Ethernet, to-be-transmitted data transmitted from a data link layer; the determining a first integral number according to a data amount of the received to-be-transmitted data and a transmission bandwidth of an electrophysical sub-channel specifically includes: determining, by the RS, the first integral number according to the data amount of the received to-be-transmitted data and the transmission bandwidth of the electrophysical sub-channel; and the distributing the to-be-transmitted data to the first integral number of electrophysical sub-channels specifically includes: distributing, by the RS, the to-be-transmitted data to the first integral number of electrophysical sub-channels.

With reference to the first aspect or the first possible implementation manner of the first aspect, in a second possible implementation manner, the distributing the to-be-transmitted data to a first integral number of electrophysical sub-channels includes: distributing, based on a distribution period, the to-be-transmitted data in a unit of data frame to the first integral number of electrophysical sub-channels in a polling manner, where when the to-be-transmitted data is distributed in a unit of data frame to the first integral number of electrophysical sub-channels, a time mark used to indicate a distribution sequence is added into the data frame according to the distribution sequence.

With reference to the second possible implementation manner of the first aspect, in a third possible implementation manner, the distributing, based on a distribution period, the to-be-transmitted data in a unit of data frame to the first integral number of electrophysical sub-channels in a polling manner specifically includes: in one distribution period, distributing the to-be-transmitted data in a unit of data frame to one electrophysical sub-channel, until the distribution period ends; and in a next distribution period, distributing the to-be-transmitted data in a unit of data frame to a next electrophysical sub-channel, where when the distribution period ends, a switching mark is added into the last data frame distributed to the electrophysical sub-channel, and the switching mark is used to identify that a next data frame of a current data frame is distributed to a next electrophysical sub-channel.

With reference to the third possible implementation manner of the first aspect, in a fourth possible implementation manner, the adding a switching mark into the last data frame distributed to the electrophysical sub-channel includes: adding a switching mark into a preamble field of the last data frame distributed to each electrophysical sub-channel.

With reference to the second possible implementation manner of the first aspect or the third possible implementation manner of the first aspect or the fourth possible implementation manner of the first aspect, in a fifth possible implementation manner, the adding a time mark used to indicate a distribution sequence into the data frame includes: adding the time mark into the preamble field of the data frame.

With reference to the first aspect, in a sixth possible implementation manner, the receiving to-be-transmitted data specifically includes: receiving, by a network layer, the to-be-transmitted data; the determining a first integral number according to a data amount of the received to-be-transmitted data and a transmission bandwidth of an electrophysical sub-channel specifically includes: determining, by the network layer, the first integral number according to the data amount of the received to-be-transmitted data and the transmission bandwidth of the electrophysical sub-channel; and the distributing the to-be-transmitted data to the first integral number of electrophysical sub-channels specifically includes: dividing, by the network layer, the to-be-transmitted data into a first integral number of pieces of to-be-transmitted data, and transmitting the first integral number of pieces of to-be-transmitted data to the first integral number of electrophysical sub-channels on a physical layer through a data link layer and an RS layer.

With reference to the first aspect or the first possible implementation manner of the first aspect or the second possible implementation manner of the first aspect or the third possible implementation manner of the first aspect or the fourth possible implementation manner of the first aspect or the fifth possible implementation manner of the first aspect or the sixth possible implementation manner, in a seventh possible implementation manner, the determining a first integral number according to a data amount of the received to-be-transmitted data and a transmission bandwidth of an electrophysical sub-channel specifically includes: calculating a data amount of to-be-transmitted data received in a previous reference time, where the reference time is a preset time period in which the data amount of the to-be-transmitted data is calculated; and determining a first integral number corresponding to a current reference time according to the calculated data amount of the to-be-transmitted data received in the previous reference time and the transmission bandwidth of the electrophysical sub-channel; before the distributing the to-be-transmitted data to the first integral number of electrophysical sub-channels, the method further includes: detecting whether a first integral number corresponding to the previous reference time is equal to the first integral number corresponding to the current reference time; and if the first integral number corresponding to the previous reference time is unequal to the first integral number corresponding to the current reference time, determining at least one to-be-adjusted electrophysical sub-channel, adjusting a state of the at least one to-be-adjusted electrophysical sub-channel, and determining a first integral number of electrophysical sub-channels corresponding to the current reference time; if the first integral number corresponding to the previous reference time is equal to the first integral number corresponding to the current reference time, determining the first integral number of electrophysical sub-channels, which are on the physical layer and correspond to the previous reference time, as a first integral number of electrophysical sub-channels corresponding to the current reference time; and the distributing the to-be-transmitted data to the first integral number of electrophysical sub-channels specifically includes: distributing the to-be-transmitted data to the determined first integral number of electrophysical sub-channels corresponding to the current reference time.

With reference to the seventh possible implementation manner of the first aspect, in an eighth possible implementation manner, the if the first integral number corresponding to the previous reference time is unequal to the first integral number corresponding to the current reference time, determining at least one to-be-adjusted electrophysical sub-channel, adjusting a state of the at least one to-be-adjusted electrophysical sub-channel, and determining a first integral number of electrophysical sub-channels corresponding to the current reference time specifically includes: if the first integral number corresponding to the current reference time is smaller than the first integral number corresponding to the previous reference time, determining a third integral number of first to-be-adjusted electrophysical sub-channels, where the first to-be-adjusted electrophysical sub-channels are electrophysical sub-channels in an active state; switching states of the third integral number of first to-be-adjusted electrophysical sub-channels from the active state to a sleep state; and determining electrophysical sub-channels currently in the active state as the first integral number of electrophysical sub-channels corresponding to the current reference time, where the third integral number is a difference between the first integral number corresponding to the previous reference time and the first integral number corresponding to the current reference time; and if the first integral number corresponding to the current reference time is greater than the first integral number corresponding to the previous reference time, determining a fourth integral number of second to-be-adjusted electrophysical sub-channels, where the second to-be-adjusted electrophysical sub-channels are electrophysical sub-channels in the sleep state; switching states of the fourth integral number of second to-be-adjusted electrophysical sub-channels from the sleep state to an active state; and determining the electrophysical sub-channels currently in the active state as the first integral number of electrophysical sub-channels corresponding to the current reference time, where the fourth integral number is a difference between the first integral number corresponding to the current reference time and the first integral number corresponding to the previous reference time.

According to a second aspect, an embodiment of the present invention provides a method for transmitting data in the Ethernet, including: receiving in a data receiving device, through a first integral number of electrophysical sub-channels, data sent by a data sending device, where the data sent by the sending device is data generated after to-be-transmitted data of a sending end is distributed to the first integral number of electrophysical sub-channels in the data sending device and is processed by the first integral number of electrophysical sub-channels in the data sending device, the first integral number is greater than zero, and the first integral number is determined based on a data amount of the to-be-transmitted data and a bandwidth of the electrophysical sub-channel in the data sending device; and aggregating, according to a time mark carried in each data frame in the received data, the data received by the first integral number of electrophysical sub-channels in the data receiving device into a data flow.

In a first possible implementation manner of the second aspect, the aggregating, according to a time mark carried in each data frame in the received data, the data received by the first integral number of electrophysical sub-channels in the data receiving device into a data flow includes: reading one data frame from one electrophysical sub-channel; inserting, according to the time mark carried in the data frame, the data frame into a position corresponding to the time mark in the data flow; and detecting whether the data frame carries a switching mark; and if the data frame does not carry the switching mark, reading a next data frame from the electrophysical sub-channel; if the data frame carries the switching mark, reading a next data frame from a next electrophysical sub-channel of the electrophysical sub-channel, until all data frames are read.

According to a third aspect, an embodiment of the present invention provides a data sending device including: a receiving unit, configured to receive to-be-transmitted data; a processing unit, configured to determine a first integral number according to a data amount of the received to-be-transmitted data and a transmission bandwidth of an electrophysical sub-channel, where the first integral number is the number of electrophysical sub-channels which are on a physical layer and configured to transmit the to-be-transmitted data, the electrophysical sub-channel is configured to implement a function of a physical coding sublayer PCS in the Ethernet, and the first integral number is greater than zero, where the processing unit is further configured to distribute the to-be-transmitted data to a first integral number of electrophysical sub-channels, and the electrophysical sub-channel is configured to perform coding and scrambling on the to-be-transmitted data and send the to-be-transmitted data on which the coding and scrambling have been performed to a second integral number of photophysical sub-channels, where the second integral number is greater than zero; and a photophysical sub-channel, configured to send after processing data from the first integral number of electrophysical sub-channels.

In a first possible implementation manner of the third aspect, the receiving unit is specifically configured to receive, on a reconciliation sublayer RS in the Ethernet, to-be-transmitted data transmitted from a data link layer; the processing unit is specifically configured to determine, on the RS, the first integral number according to the data amount of the received to-be-transmitted data and the transmission bandwidth of the electrophysical sub-channel; and the processing unit is specifically configured to distribute, on the RS, the to-be-transmitted data to the first integral number of electrophysical sub-channels.

With reference to the third aspect or the first possible implementation manner of the third aspect, in a second possible implementation manner, that the processing unit is specifically configured to distribute, on the RS, the to-be-transmitted data to the first integral number of electrophysical sub-channels includes: distributing, based on a distribution period, the to-be-transmitted data in a unit of data frame to the first integral number of electrophysical sub-channels in a polling manner, where when the to-be-transmitted data is distributed in a unit of data frame to the first integral number of electrophysical sub-channels, a time mark used to indicate a distribution sequence is added into the data frame according to the distribution sequence.

With reference to the second possible implementation manner of the third aspect, in a third possible implementation manner, that the processing unit is specifically configured to distribute, based on a distribution period, the to-be-transmitted data in a unit of data frame to the first integral number of electrophysical sub-channels in a polling manner includes: in one distribution period, distributing the to-be-transmitted data in a unit of data frame to one electrophysical sub-channel, until the distribution period ends; and in a next distribution period, distributing the to-be-transmitted data in a unit of data frame to a next electrophysical sub-channel, where when the distribution period ends, a switching mark is added into the last data frame distributed to the electrophysical sub-channel, and the switching mark is used to identify that a next data frame of a current data frame is distributed to a next electrophysical sub-channel.

With reference to the third aspect, in a fourth possible implementation manner, the receiving unit is specifically configured to receive, on a network layer, the to-be-transmitted data; the processing unit is specifically configured to determine, on the network layer, the first integral number according to the data amount of the received to-be-transmitted data and the transmission bandwidth of the electrophysical sub-channel; and the processing unit is specifically configured to divide, on the network layer, the to-be-transmitted data into a first integral number of pieces of to-be-transmitted data, and transmit the first integral number of pieces of to-be-transmitted data to the first integral number of electrophysical sub-channels on a physical layer through a data link layer and an RS layer.

With reference to the third aspect or the first possible implementation manner of the third aspect or the second possible implementation manner of the third aspect or the third possible implementation manner of the third aspect or the fourth possible implementation manner of the third aspect, in a fifth possible implementation manner, that the processing unit is configured to determine a first integral number according to a data amount of the received to-be-transmitted data and a transmission bandwidth of an electrophysical sub-channel specifically includes: calculating a data amount of to-be-transmitted data received in a previous reference time, where the reference time is a preset time period in which the data amount of the to-be-transmitted data is calculated; and determining a first integral number corresponding to a current reference time according to the calculated data amount of the to-be-transmitted data received in the previous reference time and the transmission bandwidth of the electrophysical sub-channel; the processing unit is further configured to detect whether a first integral number corresponding to the previous reference time is equal to the first integral number corresponding to the current reference time; and if the first integral number corresponding to the previous reference time is unequal to the first integral number corresponding to the current reference time, determine at least one to-be-adjusted electrophysical sub-channel, adjust a state of the at least one to-be-adjusted electrophysical sub-channel, and determine a first integral number of electrophysical sub-channels corresponding to the current reference time; if the first integral number corresponding to the previous reference time is equal to the first integral number corresponding to the current reference time, determine a first integral number of electrophysical sub-channels, which are on the physical layer and correspond to the previous reference time, as the first integral number of electrophysical sub-channels corresponding to the current reference time; and that the processing unit is further configured to distribute the to-be-transmitted data to a first integral number of electrophysical sub-channels specifically includes: distributing the to-be-transmitted data to the determined first integral number of electrophysical sub-channels corresponding to the current reference time.

With reference to the fifth possible implementation manner of the third aspect, in a sixth possible implementation manner, that the processing unit is specifically configured to: if the first integral number corresponding to the previous reference time is unequal to the first integral number corresponding to the current reference time, determine at least one to-be-adjusted electrophysical sub-channel, adjust a state of the at least one to-be-adjusted electrophysical sub-channel, and determine a first integral number of electrophysical sub-channels corresponding to the current reference time, specifically includes: if the first integral number corresponding to the current reference time is smaller than the first integral number corresponding to the previous reference time, determining a third integral number of first to-be-adjusted electrophysical sub-channels, where the first to-be-adjusted electrophysical sub-channels are electrophysical sub-channels in an active state; switching states of the third integral number of first to-be-adjusted electrophysical sub-channels from the active state to a sleep state; and determining electrophysical sub-channels currently in the active state as the first integral number of electrophysical sub-channels corresponding to the current reference time, where the third integral number is a difference between the first integral number corresponding to the previous reference time and the first integral number corresponding to the current reference time; and if the first integral number corresponding to the current reference time is greater than the first integral number corresponding to the previous reference time, determining a fourth integral number of second to-be-adjusted electrophysical sub-channels, where the second to-be-adjusted electrophysical sub-channels are electrophysical sub-channels in the sleep state; switching states of the fourth integral number of second to-be-adjusted electrophysical sub-channels from the sleep state to an active state; and determining electrophysical sub-channels currently in the active state as the first integral number of electrophysical sub-channels corresponding to the current reference time, where the fourth integral number is a difference between the first integral number corresponding to the current reference time and the first integral number corresponding to the previous reference time.

According to a fourth aspect, an embodiment of the present invention provides a data receiving device, including: a first integral number of electrophysical sub-channels in a plurality of electrophysical sub-channels, configured to receive data sent by a data sending device, where the data sent by the sending device is data generated after to-be-transmitted data of a sending end is distributed to the first integral number of electrophysical sub-channels in the data sending device and is processed by the first integral number of electrophysical sub-channels in the data sending device, the first integral number is greater than zero, and the first integral number is determined based on a data amount of the to-be-transmitted data and a bandwidth of the electrophysical sub-channel in the data sending device; and a processing unit, configured to aggregate, according to a time mark carried in each data frame in the received data, the data received by the first integral number of electrophysical sub-channels into a data flow.

In a first possible implementation manner of the fourth aspect, the processing unit is specifically configured to read one data frame from one electrophysical sub-channel; insert, according to the time mark carried in the data frame, the data frame into a position corresponding to the time mark in the data flow; and detect whether the data frame carries a switching mark; and if the data frame does not carry the switching mark, read a next data frame from the electrophysical sub-channels; if the data frame carries the switching mark, read a next data frame from a next electrophysical sub-channel of the electrophysical sub-channel, until all data frames are read.

According to a fifth aspect, an embodiment of the present invention provides a system for transmitting data in the Ethernet, including a data sending device and a data receiving device, where the data sending device is the data sending device according to the foregoing embodiments, and the data receiving device is the data receiving device according to the foregoing embodiments.

The embodiments of the present invention provide a method, an apparatus, and a system for transmitting data in the Ethernet, in which to-be-transmitted data is distributed to a first integral number of electrophysical sub-channels, where the to-be-transmitted data is coded, scrambled, and checked, and then a first integral number of pieces of to-be-transmitted data are transmitted through a second integral number of photophysical sub-channels. In this way, the to-be-transmitted data is transmitted through multiple electrophysical sub-channels and photophysical sub-channels; and when a data rate is increased, electrophysical sub-channels can be added so that the to-be-transmitted data is distributed to the added electrophysical sub-channels for transmission. It is unnecessary to increase a bit width corresponding to each electrophysical sub-channel and it is also unnecessary to increase the number of virtual channels corresponding to each electrophysical sub-channel. As a result, an objective of reducing the complexity of data processing while meeting high-rate data transmission is achieved. Moreover, by changing in real time, according to a data amount of the to-be-transmitted data, the number of the electrophysical sub-channels configured to transmit the to-be-transmitted data, a bandwidth of a physical interface of the high-speed Ethernet can be adjusted flexibly, which achieves effective resource utilization and energy saving.

BRIEF DESCRIPTION OF DRAWINGS

To describe the technical solutions in the embodiments of the present invention or in the prior art more clearly, the following briefly introduces the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

Figure 1:
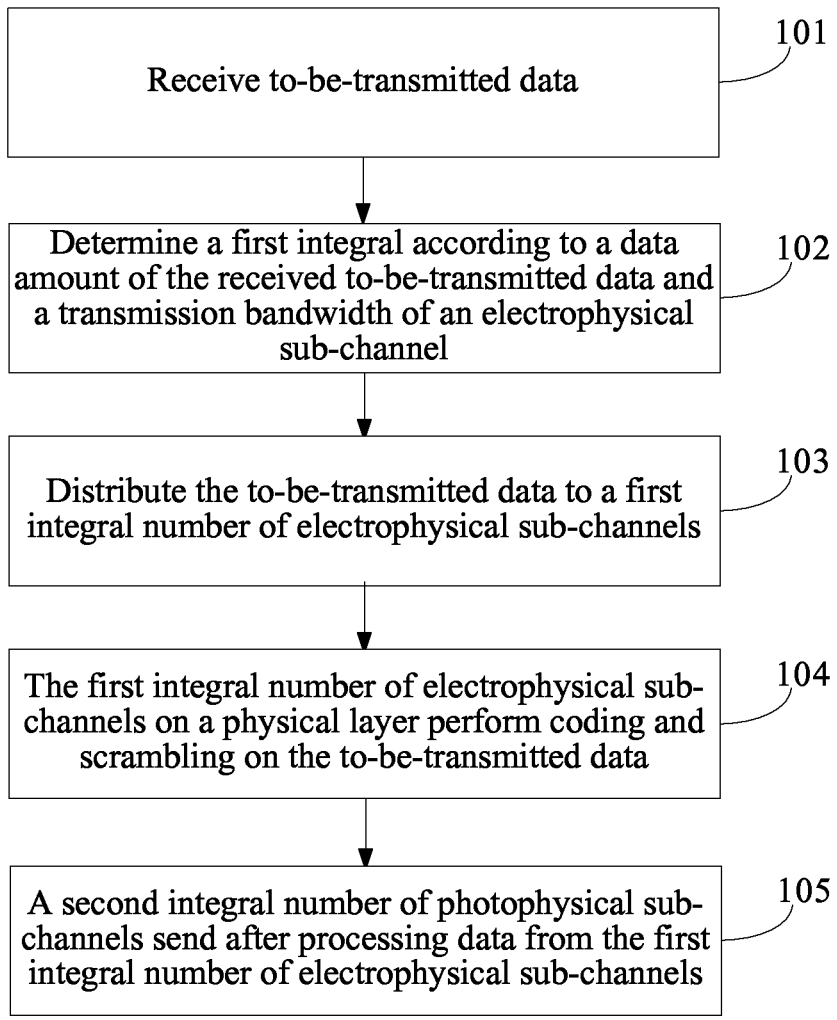
FIG. 1 is a schematic diagram of a method for transmitting data in the Ethernet according to an embodiment of the present invention.

An embodiment of the present invention provides a method for transmitting data in the Ethernet. As shown in FIG. 1, the method includes:

101: Receive to-be-transmitted data.

Optionally, the to-be-transmitted data is a MAC (Media Access Control, media access control) frame.

It should be noted that: in the embodiment of the present invention, the method is applicable to the Ethernet, where a layer structure of the Ethernet includes a network layer, a data link layer, an RS (Reconciliation Sublayer, reconciliation sublayer), and a physical layer.

102: Determine a first integral number according to a data amount of the received to-be-transmitted data and a transmission bandwidth of an electrophysical sub-channel.

The first integral number is the number of electrophysical sub-channels which are on the physical layer and configured to transmit the to-be-transmitted data, and the first integral number is greater than zero. In the present invention, the Ethernet has N (N is an integer greater than 1) electrophysical sub-channels which can work in parallel, and determines, according to the data amount of the to-be-transmitted data and the bandwidth of each electrophysical sub-channel, to select a matched number of electrophysical sub-channels from the N electrophysical sub-channels to transmit the to-be-transmitted data.

Figure 2:
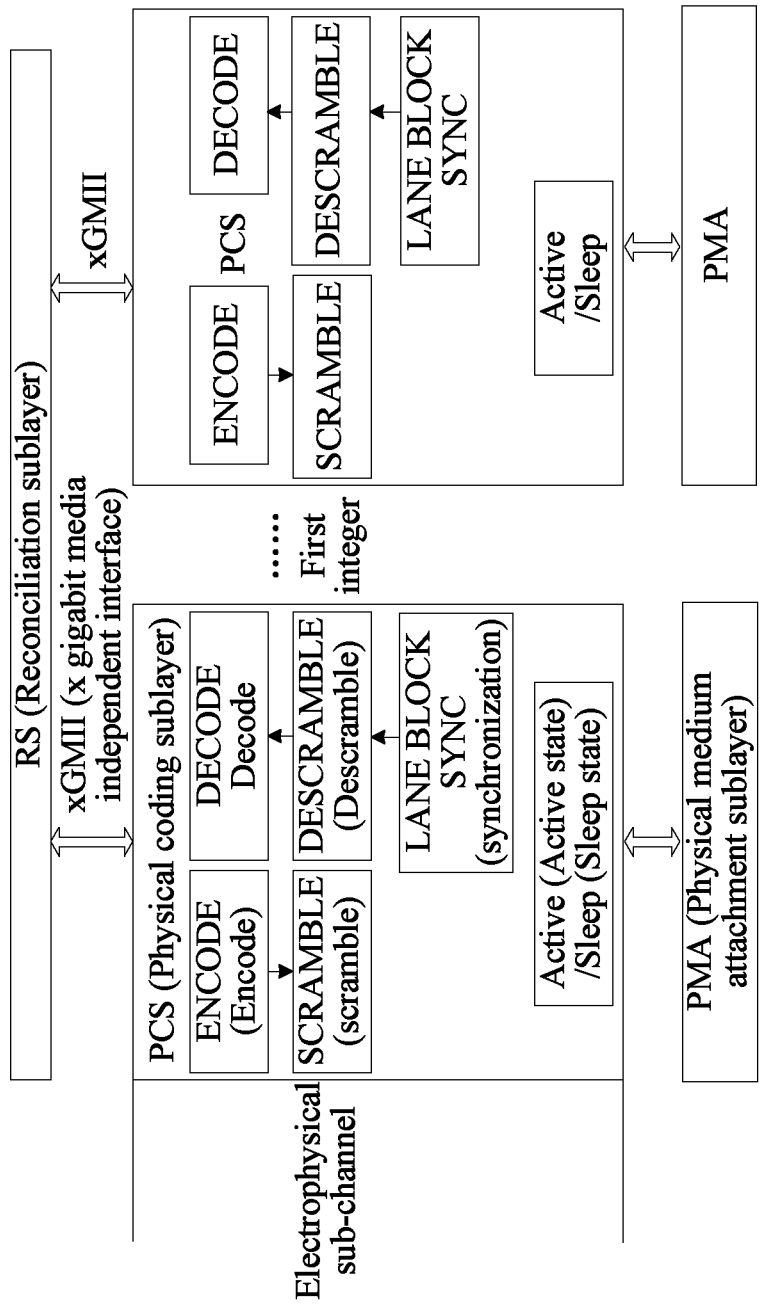
FIG. 2 is a schematic diagram of an electrophysical sub-channel according to an embodiment of the present invention.

The electrophysical sub-channel is configured to implement a function of a PCS (Physical Coding Sublayer, physical coding sublayer) in the Ethernet, and perform coding and scrambling or synchronous decoding on the received to-be-transmitted data, as shown in FIG. 2. The coding and the decoding performed by the electrophysical sub-channel both refer to coding and decoding in the PCS, for example, 8B/10B coding and decoding, 64B/66B coding and decoding, and the like.

Specifically, in the Ethernet, the first integral number may be determined by the network layer according to the data amount of the received to-be-transmitted data and the transmission bandwidth of the electrophysical sub-channel; or the first integral number may be determined by the RS according to the data amount of the received to-be-transmitted data and the transmission bandwidth of the electrophysical sub-channel.

If the RS determines the first integral number according to the data amount of the received to-be-transmitted data and the transmission bandwidth of the electrophysical sub-channel, step 101 may be specifically: receiving, by the RS in the Ethernet, the to-be-transmitted data from the data link layer.

Further, when the RS receives the to-be-transmitted data from the data link layer, the RS may calculate the data amount of the received to-be-transmitted data, so as to determine, according to the calculated data amount of the to-be-transmitted data and the transmission bandwidth of the electrophysical sub-channel, the first integral number, that is, determine the number of the electrophysical sub-channels configured to transmit the to-be-transmitted data.

If the to-be-transmitted data is a MAC frame, since a frame header in each MAC frame carries a frame length of each MAC frame, the RS can obtain the data amount of the to-be-transmitted data received in a reference time by calculating the frame lengths of all MAC frames received in the reference time.

Further, the RS can calculate a data amount of to-be-transmitted data received in a previous reference time. A first integral number corresponding to a current reference time is determined according to the calculated data amount of the to-be-transmitted data received in the previous reference time and the transmission bandwidth of the electrophysical sub-channel.

The reference time refers to a time period in which the data amount of the received to-be-transmitted data is calculated, and the reference time may be preset. In an application scenario, the reference time may be the same as the time in which the to-be-transmitted data received in the reference time is distributed to a first integral number of electrophysical sub-channels.

It should be noted that the corresponding first integral number in a first reference time is preset, and may be set according to an empirical amount of to-be-transmitted data.

If the network layer determines the first integral number according to the data amount of the received to-be-transmitted data and the transmission bandwidth of the electrophysical sub-channel, step 101 may be specifically: receiving, by the network layer, the to-be-transmitted data.

It should be noted that the transmission bandwidth of the electrophysical sub-channel is preset.

It should be noted that in the present invention, an implementation method used by the network layer to determine the first integral number according to the data amount of the received to-be-transmitted data and the transmission bandwidth of the electrophysical sub-channel may be the same as or different from the method used by the RS to determine the first integral number, which is not limited in the present invention.

103: Distribute the to-be-transmitted data to the first integral number of electrophysical sub-channels.

Figure 3:
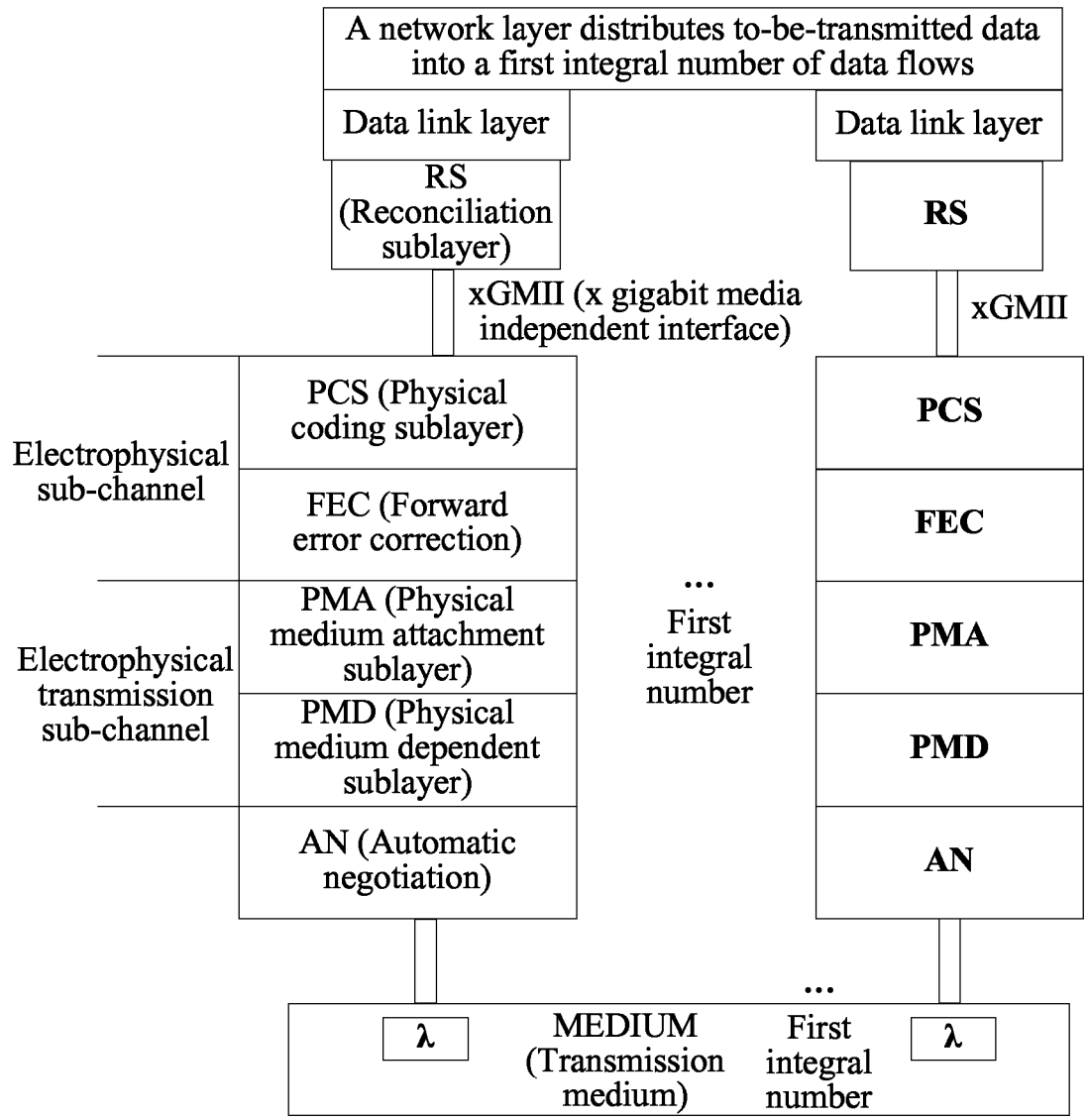
FIG. 3 is a schematic diagram of another method for transmitting data in the Ethernet according to an embodiment of the present invention.

Specifically, if the network layer determines the first integral number according to the data amount of the received to-be-transmitted data and the transmission bandwidth of the electrophysical sub-channel, the network layer divides the to-be-transmitted data into a first integral number of pieces of to-be-transmitted data, and sends the first integral number of pieces of to-be-transmitted data to the first integral number of electrophysical sub-channels on the physical layer through the data link layer and the RS, as shown in FIG. 3.

After the network layer determines the first integral number, the network layer divides the received to-be-transmitted data into the first integral number of pieces of to-be-transmitted data, sends the first integral number of pieces of to-be-transmitted data to a first integral number of data link layers and RSs, and transmits the first integral number of pieces of to-be-transmitted data to the corresponding first integral number of electrophysical sub-channels on the physical layer through the first integral number of data link layers and the RSs.

If the RS determines the first integral number according to the data amount of the received to-be-transmitted data and the transmission bandwidth of the electrophysical sub-channel, the RS distributes the received to-be-transmitted data to the first integral number of electrophysical sub-channels.

Figure 4:
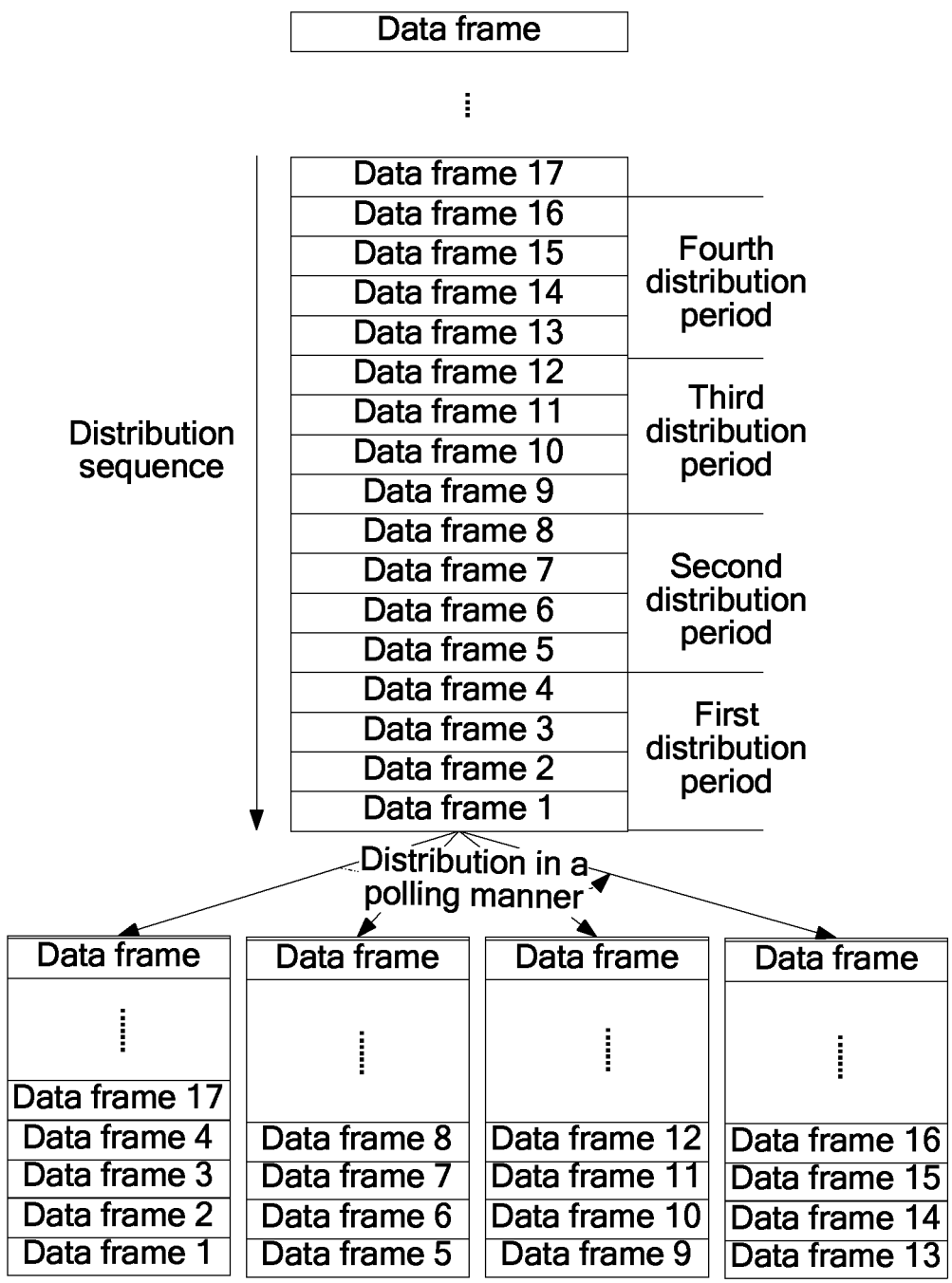
FIG. 4 is a schematic diagram of a method for distributing data through multiple channels according to an embodiment of the present invention when data is transmitted in the Ethernet.

Specifically, the RS may distribute, based on a distribution period, the to-be-transmitted data in a unit of data frame to the first integral number of electrophysical sub-channels in a polling manner, as shown in FIG. 4.

When the to-be-transmitted data is distributed in a unit of data frame to the first integral number of electrophysical sub-channels, a time mark is added into the data frame according to a distribution sequence. The time mark is used to identify a distribution sequence of the data frames, that is, the time mark is used to indicate the distribution sequence of the data frames, so that a data receiving device may aggregate the data frames into a data flow according to the time mark.

Optionally, the reference time includes a first integral number of distribution periods.

Specifically, in one distribution period, the to-be-transmitted data is distributed in a unit of data frame to one electrophysical sub-channel until the distribution period ends. In a next distribution period, the to-be-transmitted data is distributed in a unit of data frame to a next electrophysical sub-channel.

When the distribution period ends, a switching mark is added into the last data frame distributed to the electrophysical sub-channel. The switching mark is used to identify that a next data frame of a current data frame is distributed to a next electrophysical sub-channel.

Specifically, after the RS determines the first integral number according to the data amount of the received to-be-transmitted data and the transmission bandwidth of the electrophysical sub-channel, the RS distributes, based on the distribution period, the to-be-transmitted data to the first integral number of electrophysical sub-channels. That is, in one distribution period, the to-be-transmitted data is distributed in a unit of data frame to one electrophysical channel only. After the distribution period ends, in a next distribution period, the to-be-transmitted data is distributed in a unit of data frame to a next electrophysical sub-channel, until the to-be-transmitted data is all distributed to the first integral number of electrophysical sub-channels in a polling manner.

Further, in one distribution period, the to-be-transmitted data is distributed in a unit of data frame to one electrophysical sub-channel, and a time mark is added into the data frame according to the distribution sequence of transmitting the to-be-transmitted data to the electrophysical sub-channel, until the distribution period ends. When the distribution period ends, a switching mark is added into the last data frame distributed to the electrophysical sub-channel.

Exemplarily, if the transmitted data is a MAC frame and the first integral number determined by the RS is 4, the RS needs to distribute the MAC frame to 4 electrophysical sub-channels. The distribution period is 1 microsecond. After the RS determines the first integral number, in the first distribution period, the RS distributes the MAC frame in a unit of frame to the first electrophysical sub-channel, as shown in FIG. 4; and when the RS distributes the MAC frame, the RS adds a time mark into the MAC frame according to the distribution sequence. When 1 microsecond passes, a switching mark is added into the last MAC frame distributed to the first electrophysical sub-channel, so that after reading the MAC frame, the data receiving device may learn that a next MAC frame of the MAC frame is distributed to a next electrophysical sub-channel according to the switching mark carried in the MAC frame. That is, when 1 microsecond passes, a fourth MAC frame is distributed to the first electrophysical sub-channel, and in that case, a switching mark is added into the fourth MAC frame. In the second distribution period, a MAC frame in a unit of the frame continues to be distributed to the second electrophysical sub-channel, until all MAC frames are distributed to the 4 electrophysical sub-channels in a polling manner.

Further, a time mark is added into a preamble field of the data frame. A switching mark is added into a preamble field of the last data frame distributed to the electrophysical sub-channel.

Figure 5:
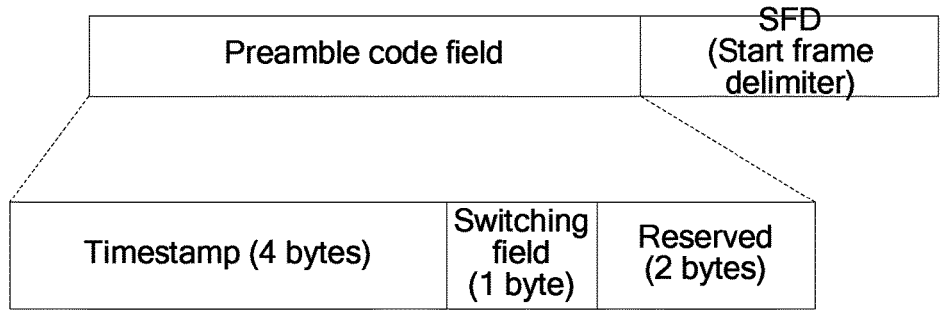
FIG. 5 is a schematic diagram of a preamble field in a data frame according to an embodiment of the present invention.

Optionally, a timestamp field and a switching field are defined in the preamble field of the data frame, as shown in FIG. 5. A time sequence of the data frame distribution may be recorded according to the timestamp field. That is, the time mark may specifically be a timestamp. Content of the switching field may be used to indicate whether a next data frame belongs to a current electrophysical sub-channel. At a receiving side, it may be determined, according to the content of the switching field, whether switching is needed when the data frame is read. Optionally, if the switching field is 0x55, it indicates that the next data frame of the current data frame belongs to the current electrophysical sub-channel. If the switching field is 0xaa, it indicates that the next data frame of the current data frame does not belong to the current electrophysical sub-channel. That is, the next data frame of the current data frame belongs to the next electrophysical sub-channel.

It should be noted that the distribution period may be preset according to the transmission bandwidth of the electrophysical sub-channel.

Further, in the present invention, if the RS and the physical layer are connected through an xGMII (x Gigabit Media Independent Interface, x gigabit media independent interface), the RS needs to convert the to-be-transmitted data into xGMII data before the RS distributes the to-be-transmitted data to the first integral number of electrophysical sub-channels, and then distribute the xGMII data to the first integral number of electrophysical sub-channels.

Where, x represents a reference rate, and the reference rate is equal to a bandwidth of a single electrophysical sub-channel.

Optionally, xGMII may be a CGMII, where the CGMII refers to a gigabit media independent interface with a reference rate of 100 G Data of the CGMII is formed by 8-bit control information and 64-bit data information.

It should be noted that in the present invention, the RS and the physical layer may also be connected through another interface, which is not limited in the present invention. If another interface is used, before the RS distributes the to-be-transmitted data to the first integral number of electrophysical sub-channels, the RS needs to convert the to-be-transmitted data into data of another interface type, and then distribute the data to the first integral number of electrophysical sub-channels.

104: The first integral number of electrophysical sub-channels perform coding and scrambling on the to-be-transmitted data.

Specifically, after receiving the to-be-transmitted data, the first integral number of electrophysical sub-channels separately perform coding and scrambling on the to-be-transmitted data. The coding in this step refers to coding in the PCS, for example, 8B/10B coding, 64B/66B coding, or the like.

Optionally, after performing coding and scrambling on the to-be-transmitted data, the first integral number of electrophysical sub-channels on the physical layer separately perform FEC (Forward Error Correction, forward error correction) check and coding on the to-be-transmitted data.

Optionally, when a 64B/66B mode may be used for coding the to-be-transmitted data, and a scrambling multinomial $1+x^{38}+x^{57}$ may be used for scrambling.

It should be noted that another mode may be used for coding the to-be-transmitted data, and another scrambling multinomial may be used for scrambling, which is not limited in the present invention.

It should be noted that another check method may be used for check code of the to-be-transmitted data, for example, BIP (Bit Interleaved Parity, bit interleaved parity) check, which is not limited in the present invention.

Exemplarily, it is assumed that interfaces of the RS and the physical layer are connected through the xGMII, the PCS and the PMA between the physical layers are connected through an xAUI (x Gigabit Attachment Unit Interface, x gigabit attachment unit interface), and the to-be-transmitted data is a MAC frame. After the first integral number of electrophysical sub-channels receive the MAC frame that is converted into xGMII data, the first integral number of electrophysical sub-channels separately perform 64B/66B coding on the MAC frame converted into the xGMII data, so as to form a 66B code block data flow, and the first integral number of electrophysical sub-channels perform scrambling on the 66B code block data flow. Optionally, before the scrambling, FEC check and coding may be performed. Then, the 66B code block data flow on which the scrambling has been performed is converted into xAUI data. Optionally, the 66B code block data flow on which the scrambling has been performed according to requirements is distributed to multiple virtual channels, and an alignment code block is inserted, and then the 66B code block data flow on the multiple virtual channels is converted in to the xAUI data by using bit multiplexing. The xAUI interface is a physical interface, and is selected flexibly according to a bandwidth of a single electrophysical sub-channel. For example, for an electrophysical sub-channel with a reference bandwidth of 100 G, the xAUI interface may be an existing CAUI (100 Gigabit Attachment Unit Interface, 100 gigabit attachment unit interface) interface; and for an electrophysical sub-channel with a reference bandwidth of 25 G, the xAUI interface may be an XXVAUI (25 Gigabit Attachment Unit Interface, 25 gigabit attachment unit interface) interface, that is, the interfaces are connected directly through one 25 G electrical interface.

It should be noted that the first integral number of electrophysical sub-channels are independent of each other.

105: A second integral number of photophysical sub-channels send after processing data from the first integral number of electrophysical sub-channels.

The second integral number is greater than zero. Further, the first integral number is an integral multiple of the second integral number. The photophysical sub-channel is configured to implement functions of PMA (Physical Medium Attachment, physical medium attachment sublayer) and PMD (Physical Medium Dependent, physical medium dependent sublayer).

Specifically, the second integral number of photophysical sub-channels separately perform physical medium attachment on the to-be-transmitted data processed by the first integral number of electrophysical sub-channels, and separately send the to-be-transmitted data through a physical medium channel.

Specifically, the physical layer performs, through the second integral number of photophysical sub-channels, physical medium attachment on the to-be-transmitted data on which coding and scrambling have been performed by the first integral number of electrophysical sub-channels, attaches the to-be-transmitted data to multiple signals, and sends the multiple signals to the data receiving device through the physical medium channel.

Figure 6:
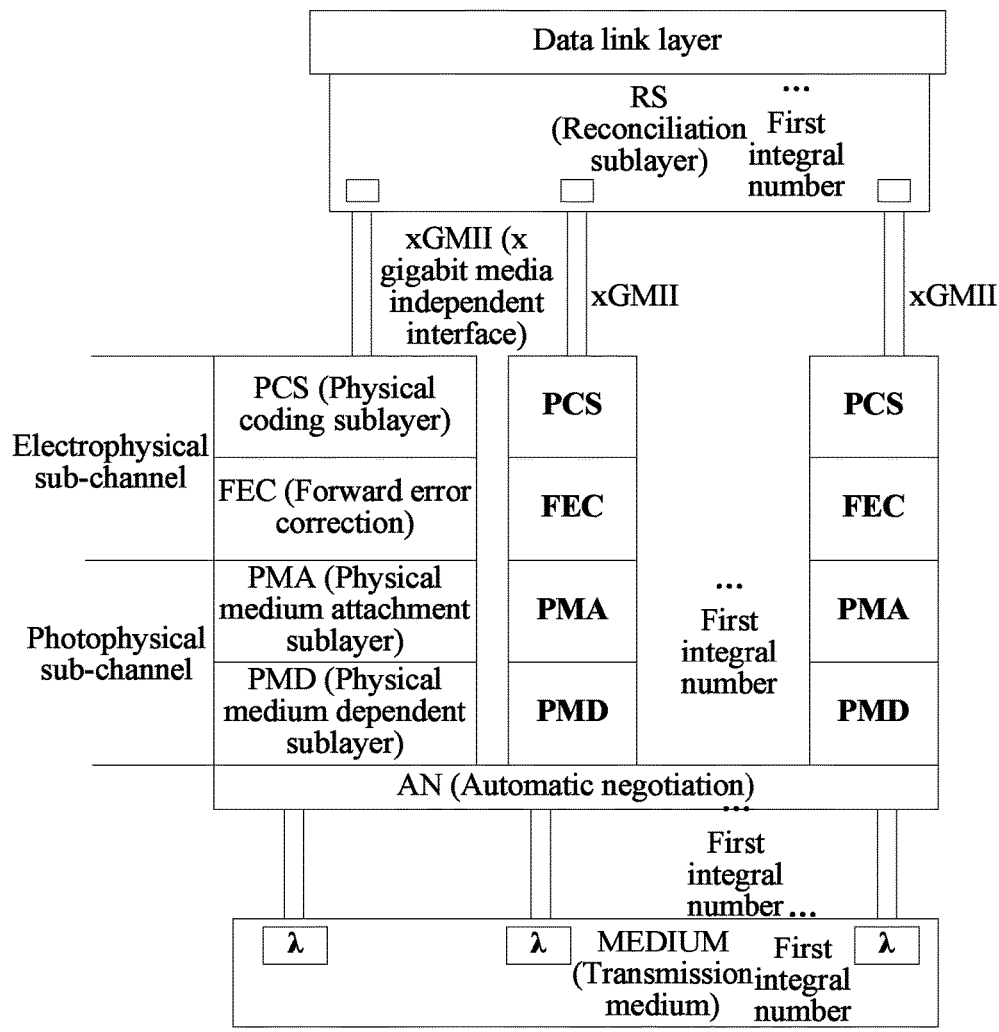
FIG. 6 is a schematic diagram of another method for transmitting data in the Ethernet according to an embodiment of the present invention.
Figure 7:
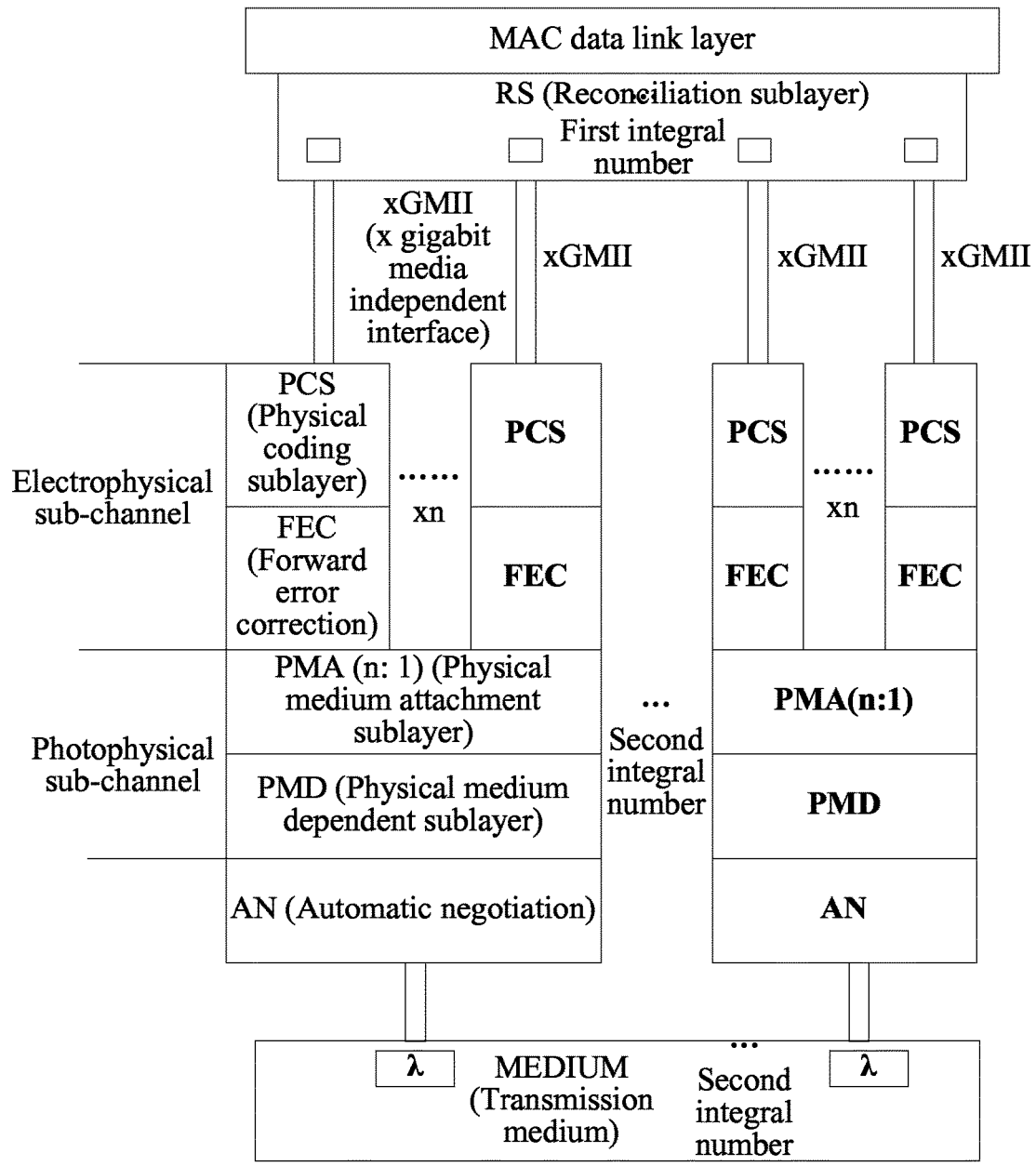
FIG. 7 is a schematic diagram of another method for transmitting data in the Ethernet according to an embodiment of the present invention.

Further, the first integral number may be equal to the second integral number, and in that case, the electrophysical sub-channels correspond to the photophysical sub-channels in a one-to-one manner, as shown in FIG. 6. The first integral number may be unequal to the second integral number, the first integral number is greater than the second integral number and is an integral multiple of the second integral number, and multiple electrophysical sub-channels transmit data by multiplexing one photophysical sub-channel, as shown in FIG. 7. FIG. 7 indicates that n electrophysical sub-channels transmit data by multiplexing one photophysical sub-channel, where n is an integer greater than zero.

It should be noted that architectures of each electrophysical sub-channel and a corresponding photophysical sub-channel are the same as an architecture of the physical layer of the Ethernet in the prior art.

The embodiment of the present invention provides a method for transmitting data in the Ethernet, in which to-be-transmitted data is distributed to a first integral number of electrophysical sub-channels, where the to-be-transmitted data is coded and scrambled through the electrophysical sub-channels, and then a first integral number of pieces of to-be-transmitted data are transmitted through a second integral number of photophysical sub-channels. In this way, the to-be-transmitted data is transmitted through multiple electrophysical sub-channels and photophysical sub-channels; and when a data rate is increased, electrophysical sub-channels can be added so that the to-be-transmitted data is distributed to the added electrophysical sub-channels for transmission. It is unnecessary to increase a bit width corresponding to each electrophysical sub-channel and it is also unnecessary to increase the number of virtual channels corresponding to each electrophysical sub-channel. As a result, an objective of reducing the complexity of data processing while meeting high-rate data transmission is achieved. Moreover, by changing in real time, according to a data amount of the to-be-transmitted data, the number of the electrophysical sub-channels configured to transmit the to-be-transmitted data, a bandwidth of a physical interface of the high-speed Ethernet can be adjusted flexibly, which achieves effective resource utilization and energy saving.

Figure 8:
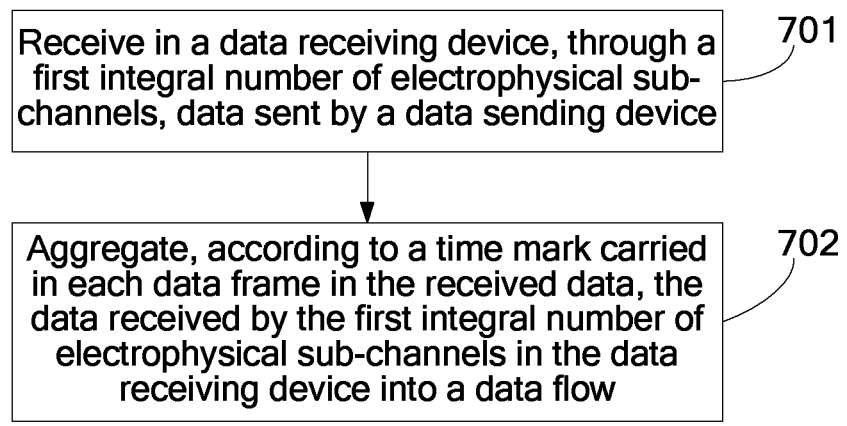
FIG. 8 is a schematic diagram of another method for transmitting data in the Ethernet according to an embodiment of the present invention.

An embodiment of the present invention provides a method for transmitting data in the Ethernet. As shown in FIG. 8, the method includes:

701: Receive in a data receiving device, through the first integral number of electrophysical sub-channels, data sent by a data sending device.

The data sent by the sending device is data generated after to-be-transmitted data of a sending end is distributed to the first integral number of electrophysical sub-channels in the data sending device and is processed by the first integral number of electrophysical sub-channels in the data sending device, the first integral number is greater than zero, and the first integral number is determined based on a data amount of the to-be-transmitted data and a bandwidth of the electrophysical sub-channel in the data sending device.

Optionally, the to-be-transmitted data is a MAC (Media Access Control, media access control) frame.

Specifically, when the data receiving device receives, through the first integral number of electrophysical sub-channels, the data sent by the data sending device, the first integral number of electrophysical sub-channels perform synchronous decoding on a received data flow.

The performing, by the first integral number of electrophysical sub-channels, synchronous decoding on a received data flow is specifically: if the data sending device performs coding by using a 64B/66B mode, first separately performing, by the first integral number of electrophysical sub-channels, 66B block synchronization on the received data flow, and identifying a 66B code block; and optionally, if a data sending side uses a mode of distribution to multiple virtual channels, restoring multiple virtual channels of bit streams by using bit demultiplexing, separately performing 66B block synchronization on the multiple virtual channels of the bit streams, and identifying the 66B code block. Then, an alignment code block is identified, and alignment is performed on the virtual channels. Then, 66B code block data flows of multiple virtual channels are realigned to be restored into 66B code block flows. Then, descrambling, decoding, and then coding are performed, where decoding is performed by using the 64B/66B mode.

Further, in the present invention, if the RS (Reconcliation Sublayer, reconciliation access layer) and the physical layer are connected through an xGMII (x Gigabit Media Independent Interface, x gigabit media independent interface), the data flow is converted into xGMII data after decoding is performed on the data flow.

Where, x represents a reference rate, and the reference rate is equal to a bandwidth of a single electrophysical sub-channel.

It should be noted that the data receiving device may be a switch, a router, or another device, which is not limited in the present invention.

702: Aggregate, according to a time mark carried in each data frame in the received data, the data received by the first integral number of electrophysical sub-channels in the data receiving device into a data flow.

The time mark is used to indicate a distribution sequence of the data frames.

Specifically, the data receiving device reads one data frame from one electrophysical sub-channel; inserts, according to the time mark carried in the data frame, the data frame into a position corresponding to the time mark in the data flow; and detects whether the data frame carries a switching mark; and if the data frame does not carry the switching mark, reads a next data frame from the electrophysical sub-channel; if the data frame carries the switching mark, reads a next data frame from a next electrophysical sub-channel of the electrophysical sub-channel, until all data frames are read.

The data receiving device reads one data frame from one electrophysical sub-channel, and obtains a time mark carried in the data frame; inserts, according to the time mark, the data frame into a corresponding position in the data flow formed by obtained data frames; and detects whether the data frame carries a switching mark, and if the data frame does not carry the switching mark, continues to read a next data frame from the electrophysical sub-channel; if the data frame carries the switching mark, reads a next data frame from a next electrophysical sub-channel. In this case, the data receiving device reads a data frame from the next electrophysical sub-channel.

Figure 9:
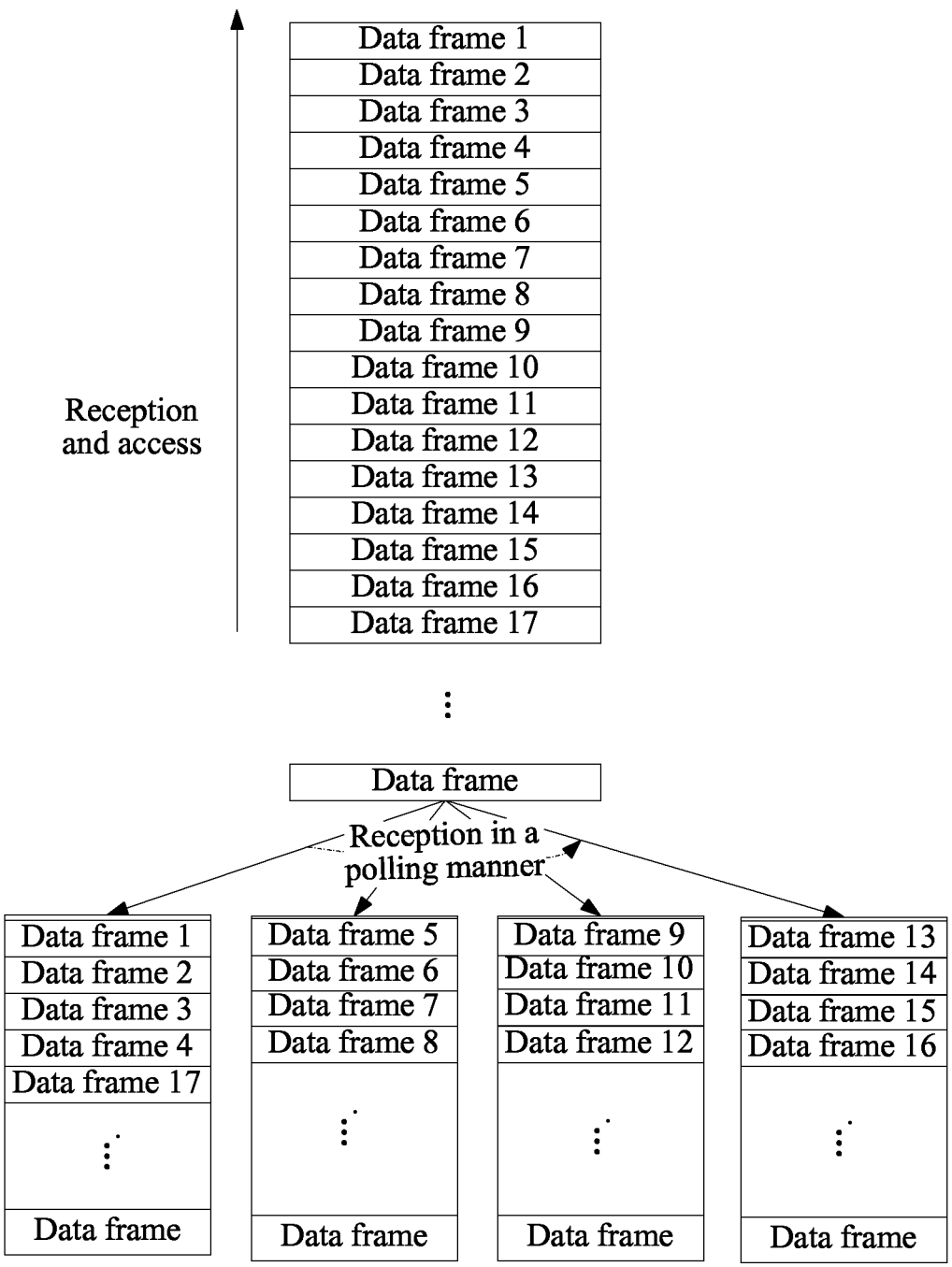
FIG. 9 is a schematic diagram of a method for transmitting received data in the Ethernet according to an embodiment of the present invention.

Exemplarily, as shown in FIG. 9, it is assumed that the data receiving device receives data sent by the sending device through 4 electrophysical sub-channels. The data receiving device reads a data frame from the first electrophysical sub-channel. When the first data frame is read, a time mark of the first data frame is obtained, and the data frame is inserted, according to the time mark, into a corresponding position in a data flow formed by obtained data frames. Since this is the first read data frame, the data frame may be directly read, and the data frame may be stored. It is detected whether the data frame carries a switching mark, and if the first data frame does not carry the switching mark, a next data frame continues to be read from the first electrophysical sub-channel. The second data frame is read, and a time mark of the second data frame is obtained. If time indicated by the time mark is earlier than time indicated by the obtained time mark of the first data frame, the second data frame is inserted behind the first data frame. If the time indicated by the time mark is later than the time indicated by the obtained time mark of the first data frame, the second data frame is inserted before the first data frame. That is, the second data frame is inserted into a corresponding position in the data flow formed by the obtained data frames. In the example, the second data frame is inserted behind the first data frame. It is detected whether the second data frame carries a switching mark, and if it is detected that the second data frame does not carry the switching mark, the third data frame continues to be read from the first electrophysical sub-channel. After that, a method for reading the third data frame is the same as a method for reading the second data frame, and the details are not described herein again. When it is detected whether the third data frame carries a switching mark, if it is detected that the third data frame does not carry the switching mark, the fourth data frame continues to be read from the first electrophysical sub-channel. When the fourth data frame is read, a time mark of the fourth data frame is obtained; after the fourth data frame is inserted, according to the time mark, into a corresponding position of the data flow formed by the obtained data frames, if it is detected the fourth data frame carries a switching mark, a next data frame is read from the second electrophysical sub-channel. Reading a data frame from the first electrophysical sub-channel is suspended. A process of reading a data frame from another electrophysical sub-channel is consistent with the process of reading a data frame from the first electrophysical sub-channel, and the details are not described herein again.

Further, a time mark is obtained from a preamble field of the data frame, and a switching mark is obtained from a preamble field of the last data frame distributed to the electrophysical sub-channel.

Optionally, a timestamp field and a switching field are defined in the preamble field of the data frame, as shown in FIG. 5. A time sequence of the data frame distribution may be recorded according to the timestamp field. That is, the time mark is specifically a timestamp field. In an embodiment, the switching mark may specifically be a switching field. Content of the switching field may be used to indicate whether a next data frame belongs to a current electrophysical sub-channel. At a receiving side, it may be determined, according to the content of the switching field, whether switching is needed when the data frame is read. Optionally, if content of the obtained switching field is 0x55, it indicates that the next data frame of the current data frame belongs to the current electrophysical sub-channel. If the obtained switching field is 0xaa, it indicates that the next data frame of the current data frame does not belong to the current electrophysical sub-channel. That is, the next data frame of the current data frame belongs to the next electrophysical sub-channel.

Further, if the time mark is obtained from the preamble field of the data frame, after the time mark of the data frame is obtained and after the data frame is inserted into a corresponding position of the time mark in the data flow, the time mark is modified into 0x55555555, so as to restore a preamble.

When it is detected whether the data frame carries the switching mark, if it is detected that the switching field of the preamble field of the data frame is 0xaa, it indicates that the next data frame is obtained from the next electrophysical sub-channel. In this case, when the data frame is obtained by switching to the next electrophysical sub-channel, the switching field of the preamble field of the data frame is modified into 0x55.

The embodiment of the present invention provides a method for transmitting data in the Ethernet, where to-be-transmitted data sent by a data sending device through a first integral number of electrophysical sub-channels is received through the first integral number of electrophysical sub-channels, and a data receiving device aggregates, according to a time mark carried in the to-be-transmitted data, the to-be-transmitted data received through the first integral number of electrophysical sub-channels into a data flow. In this way, the data sending device sends the to-be-transmitted data to the data receiving device through the first integral number of electrophysical sub-channels, so that the to-be-transmitted data is transmitted through multiple electrophysical sub-channels; and when a data rate is increased, electrophysical sub-channels can be added so that the to-be-transmitted data is distributed to the added electrophysical sub-channels for transmission. It is unnecessary to increase a bit width corresponding to each electrophysical sub-channel and it is also unnecessary to increase the number of virtual channels corresponding to each electrophysical sub-channel. As a result, an objective of reducing the complexity of data processing while meeting high-rate data transmission is achieved.

Figure 10:
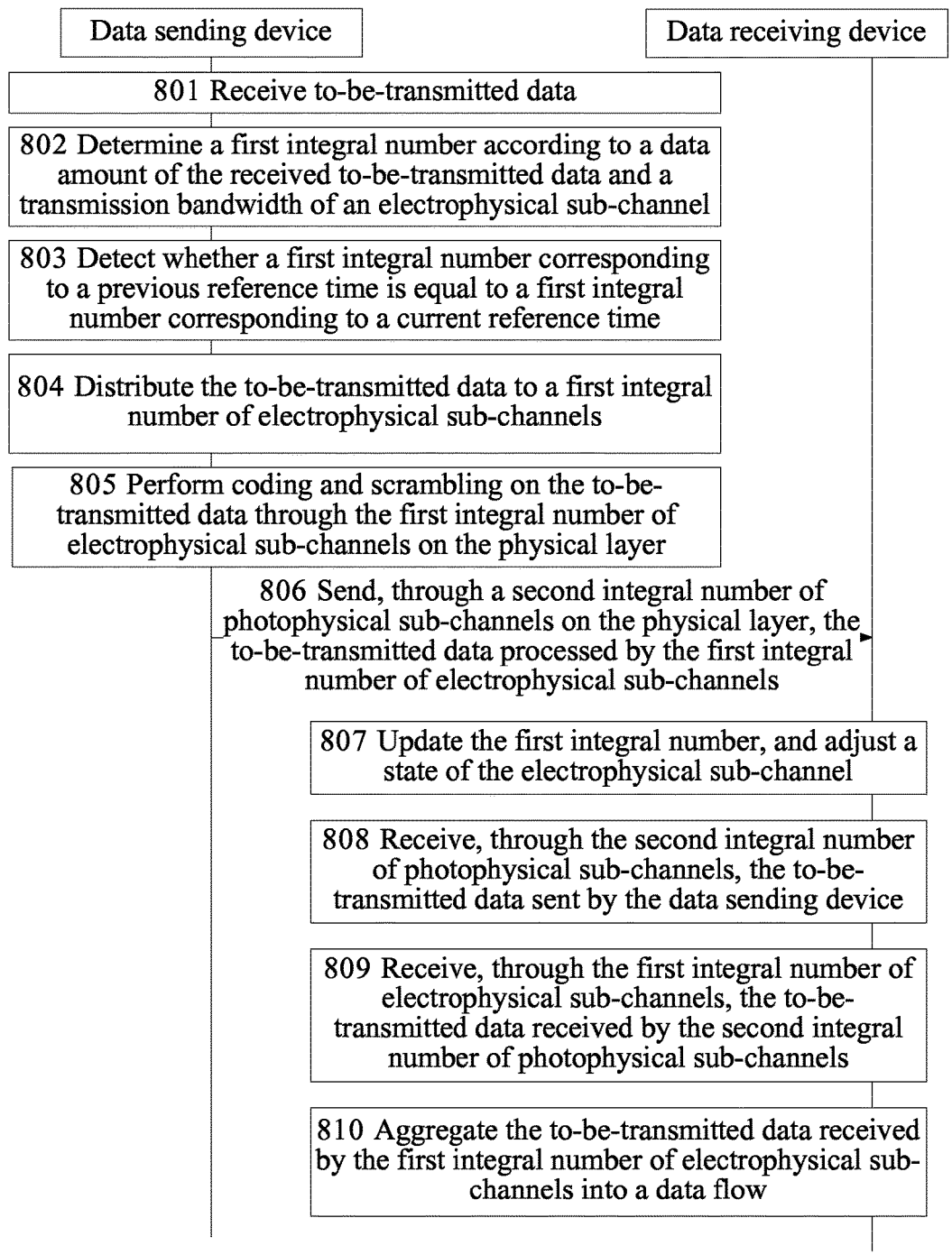
FIG. 10 is a schematic diagram of another method for transmitting data in the Ethernet according to an embodiment of the present invention.

An embodiment of the present invention provides a method for transmitting data in the Ethernet. As shown in FIG. 10, the method includes:

801: A data sending device receives to-be-transmitted data.

Specifically, reference may be made to step 101, and the details are not described herein again.

802: The data sending device determines a first integral number according to a data amount of the received to-be-transmitted data and a transmission bandwidth of an electrophysical sub-channel.

Specifically, reference may be made to step 102, and the details are not described herein again.

803: Detect whether a first integral number corresponding to a previous reference time is equal to a first integral number corresponding to a current reference time.

Specifically, after the data sending device determines the first integral number corresponding to the current reference time according to the data amount of the to-be-transmitted data received in the previous reference time and the transmission bandwidth of the electrophysical sub-channel, the data sending device may detect, on an RS, whether the first integral number corresponding to the previous reference time is equal to the first integral number corresponding to the current reference time, so as to determine whether the number of the electrophysical sub-channels in an active state at a data sending side in the current reference time meets a requirement of electrophysical sub-channels for transmitting the to-be-transmitted data.

It should be noted that the electrophysical sub-channel includes a data sending side and a data receiving side. The data sending side of the electrophysical sub-channel is configured to send data, and the data receiving side of the electrophysical sub-channel is configured to receive data. The data sending side of the electrophysical sub-channel has two states which include an active state and a sleep state. When the data sending side of the electrophysical sub-channel is in the active state, the data sending side of the electrophysical sub-channel can send data. When the data sending side of the electrophysical sub-channel is in the sleep state, the data sending side of the electrophysical sub-channel cannot send data. Likewise, the data receiving side of the electrophysical sub-channel has two states which include an active state and a sleep state. When the data receiving side of the electrophysical sub-channel is in the active state, the data receiving side of the electrophysical sub-channel can receive data. When the data receiving side of the electrophysical sub-channel is in the sleep state, the data receiving side of the electrophysical sub-channel cannot receive data.

It should be noted that when it is detected whether the first integral number corresponding to the previous reference time is equal to the first integral number corresponding to the current reference time, the number of the electrophysical sub-channels in the active state at the data sending side is the first integral number corresponding to the previous reference time.

Further, if the first integral number corresponding to the previous reference time is equal to the first integral number corresponding to the current reference time, a first integral number of electrophysical sub-channels corresponding to the previous reference time are determined as a first integral number of electrophysical sub-channels corresponding to the current reference time. If the first integral number corresponding to the previous reference time is unequal to the first integral number corresponding to the current reference time, at least one to-be-adjusted electrophysical sub-channel is determined, a state of the at least one to-be-adjusted electrophysical sub-channel is adjusted, and a first integral number of electrophysical sub-channels corresponding to the current reference time are determined.

Specifically, when it is detected that the first integral number corresponding to the previous reference time is equal to the first integral number corresponding to the current reference time, that is, the number of the electrophysical sub-channels in the active state at the data sending side meets the number of the electrophysical sub-channels required for transmitting the received to-be-transmitted data, and in that case, the first integral number of electrophysical sub-channels corresponding to the previous reference time are determined as the first integral number of electrophysical sub-channels corresponding to the current reference time.

When it is detected that the first integral number corresponding to the previous reference time is unequal to the first integral number corresponding to the current reference time, it indicates that the number of the electrophysical sub-channels in the active state at the data sending side cannot meet the number of the electrophysical sub-channels required for transmitting the received to-be-transmitted data, and in that case, at least one to-be-adjusted electrophysical sub-channel is determined, and the state of the at least one to-be-adjusted electrophysical sub-channel is adjusted, so that the number of the electrophysical sub-channels in the active state at the data sending side meets the number of the electrophysical sub-channels required for transmitting the received to-be-transmitted data.

Further, in a case where the first integral number corresponding to the previous reference time is unequal to the first integral number corresponding to the current reference time, the state of the at least one to-be-adjusted electrophysical sub-channel may be adjusted by using the following method.

If the first integral number corresponding to the current reference time is smaller than the first integral number corresponding to the previous reference time, a third integral number of first to-be-adjusted electrophysical sub-channels are determined, and sleep indication information is sent through the third integral number of first to-be-adjusted electrophysical sub-channels. States of the third integral number of first to-be-adjusted electrophysical sub-channels are switched to a sleep state. Electrophysical sub-channels currently in the active state are determined as the first integral number of electrophysical sub-channels corresponding to the current reference time.

The third integral number is a difference between the first integral number corresponding to the previous reference time and the first integral number corresponding to the current reference time.

Figure 11:
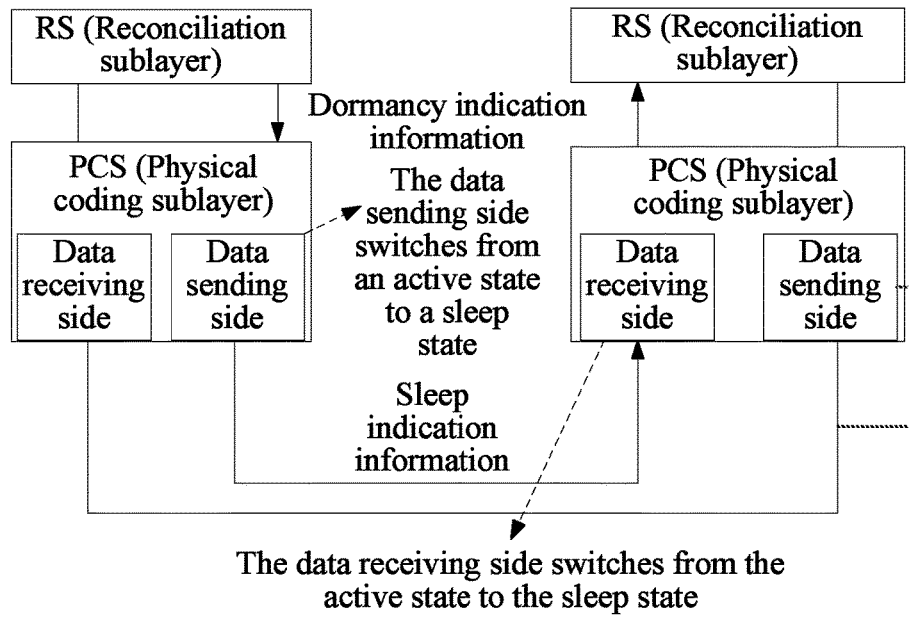
FIG. 11 is a schematic diagram of a method for decreasing electrophysical sub-channels according to an embodiment of the present invention.

Specifically, if the first integral number corresponding to the current reference time is smaller than the first integral number corresponding to the previous reference time, it indicates that the number of the electrophysical sub-channels currently in the active state at the data sending side is greater than the number of the electrophysical sub-channels which are in the active state at the data sending side and required for transmitting the to-be-transmitted data, and the number of the electrophysical sub-channels in the active state at the data sending side needs to be decreased. In this case, the data sending device determines, through the RS, the third integral number of first to-be-adjusted electrophysical sub-channels in the electrophysical sub-channels currently in the active state at the data sending side, and sends the sleep indication information through the third integral number of first to-be-adjusted electrophysical sub-channels. When transmitting the sleep indication information, the third integral number of first to-be-adjusted electrophysical sub-channels switch the states of the data sending sides of the third integral number of first to-be-adjusted electrophysical sub-channels from the active state to the sleep state, and send the sleep indication information to the data receiving device, so that the data receiving device receives the sleep indication information through a corresponding electrophysical sub-channel, and switches the state of the data receiving side of the electrophysical sub-channel receiving the sleep indication information from the active state to the sleep state. Therefore, the number of the electrophysical sub-channels currently in the active state at the data sending side is equal to the first integral number corresponding to the current reference time, so as to determine the electrophysical sub-channels in the active state as the first integral number of electrophysical sub-channels, as shown in FIG. 11.

If the first integral number corresponding to the current reference time is greater than the first integral number corresponding to the previous reference time, a fourth integral number of second to-be-adjusted electrophysical sub-channels are determined, and activation indication information is sent through the fourth integral number of second to-be-adjusted electrophysical sub-channels. States of the fourth integral number of second to-be-adjusted electrophysical sub-channels are switched to the active state. Activation response information returned is received, and the electrophysical sub-channels currently in the active state are determined as the first integral number of electrophysical sub-channels corresponding to the current reference time.

The fourth integral number is a difference between the first integral number corresponding to the current reference time and the first integral number corresponding to the previous reference time.

Figure 12:
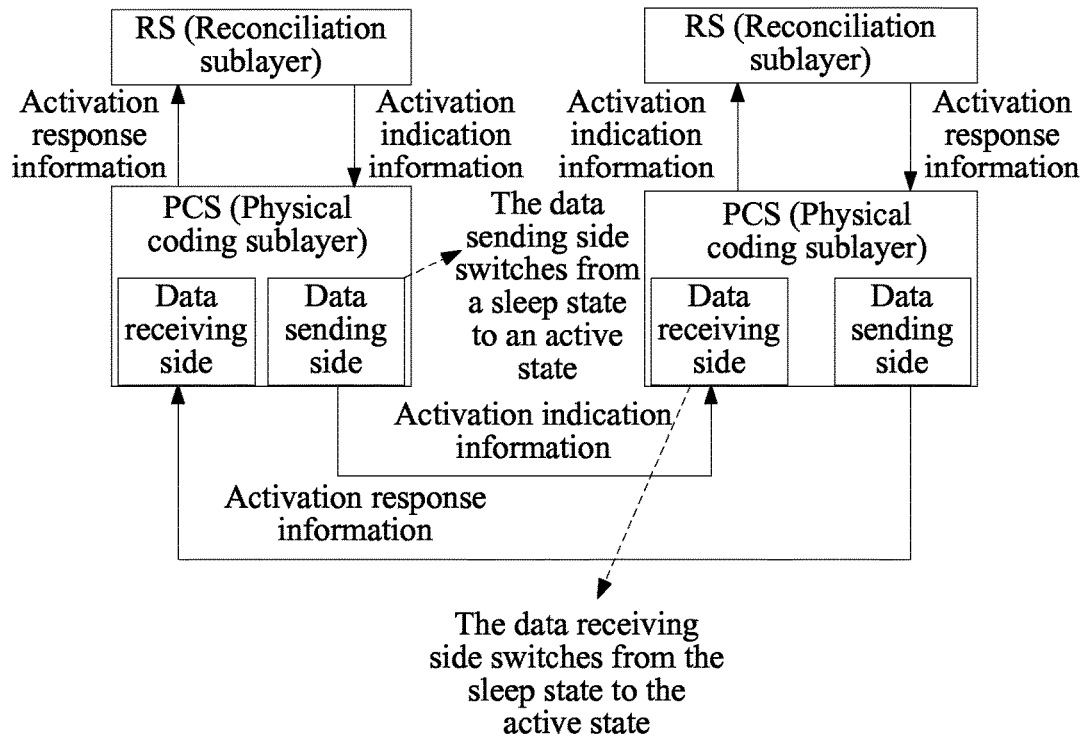
FIG. 12 is a schematic diagram of a method for increasing electrophysical sub-channels according to an embodiment of the present invention.

Specifically, if the first integral number corresponding to the current reference time is greater than the first integral number corresponding to the previous reference time, it indicates that the number of the electrophysical sub-channels currently in the active state at the data sending side is greater than the number of the electrophysical sub-channels which are in the active state at the data sending side and required for transmitting the to-be-transmitted data, and the number of the electrophysical sub-channels in the active state at the data sending side needs to be increased. In this case, the data sending device determines, through the RS, the fourth integral number of second to-be-adjusted electrophysical sub-channels in the electrophysical sub-channels currently in the sleep state at the data sending side, and sends the activation indication information through the fourth integral number of second to-be-adjusted electrophysical sub-channels. When transmitting the activation indication information, the fourth integral number of second to-be-adjusted electrophysical sub-channels switch the states of the data sending sides of the fourth integral number of second to-be-adjusted electrophysical sub-channels from the sleep state to the active state, and send the activation indication information to the data receiving device, so that the data receiving device receives the activation indication information through a corresponding electrophysical sub-channel, and switches the state of the data receiving side of the electrophysical sub-channel receiving the activation indication information from the sleep state to the active state, so as to receive data. After the data receiving device switches the electrophysical sub-channel receiving the activation indication information from the sleep state to the active state, the data receiving device returns activation response information to the data sending device through the electrophysical sub-channel receiving the activation indication information. After the data sending device receives the activation response information through the data receiving sides of the fourth integral number of second to-be-adjusted electrophysical sub-channels, the data sending device learns that the data may be sent to the data receiving device through the fourth integral number of second to-be-adjusted electrophysical sub-channels, so that the number of the electrophysical sub-channels currently in the active state at the data sending side is equal to the first integral number corresponding to the current reference time, so as to determine the electrophysical sub-channels in the active state as the first integral number of electrophysical sub-channels, as shown in FIG. 12. In this way, the electrophysical sub-channels are increased or the electrophysical sub-channels are decreased according to amount of the to-be-transmitted data, so as to change, in a flexible and changeable manner, the number of the electrophysical sub-channels configured to transmit the to-be-transmitted data, thereby further meeting the transmission requirements of dynamic service traffic.

It should be noted that the data sending device can determine the state of the data sending side of the electrophysical sub-channel. A state of the data receiving side of the electrophysical sub-channel of the data sending device is determined by an apparatus that sends data to the data sending device.

Optionally, the sleep indication information includes LPI (Low Power Idle, low power idle code block) information, the activation indication information includes IDLE (idle code block) information, and the activation response information includes IDLE-RCK (idle response code block) information.

It should be noted that the LPI information is information used to instruct the state of a data sending side or a data receiving side of an electrophysical sub-channel to be switched from the active state to the sleep state. The IDLE information is information used to instruct the state of a data sending side or a data receiving side of an electrophysical sub-channel to be switched from the sleep state to the active state. The IDLE-RCK information refers to response information sent by a data receiving side of an electrophysical sub-channel to a device that sends IDLE information, after the data receiving side switches from the sleep state to the active state upon receipt of the IDLE information.

Further, the LPI, IDLE or IDLE-RCK may be a 66B code block described in the Table 1.

TABLE 1

| | 2-bit synchronization header | 64-bit data | | | | | | | |
|---|---|---|---|---|---|---|---|---|---|
| LPI | 10 | 0x9c | 0x00 | 0x00 | 0x07 | 0x00 | 0x00 | 0x00 | 0x00 |
| IDLE-RCK | 10 | 0x9c | 0x00 | 0x00 | 0x08 | 0x00 | 0x00 | 0x00 | 0x00 |
| IDLE | 10 | 0x07 | 0x07 | 0x07 | 0x07 | 0x07 | 0x07 | 0x07 | 0x07 |

It should be noted that the data sending sides of the fourth integral number of second to-be-adjusted electrophysical sub-channel are in the sleep state, and in that case, the data sending device changes the sleep indication information into the activation indication information to activate the fourth integral number of second to-be-adjusted electrophysical sub-channels at the data sending side. In addition, the data sending device can send the activation indication information to the data receiving device through the fourth integral number of second to-be-adjusted electrophysical sub-channels, so as to activate the electrophysical sub-channels at the data receiving device side.

Certainly, the data sending device may also detect, on a network layer, whether the first integral number corresponding to the previous reference time is equal to the first integral number corresponding to the current reference time.

For a specific implementation method, reference may be made to a foregoing implementation method used by the data sending device to detect, on the RS, whether the first integral number corresponding to the previous reference time is equal to the first integral number corresponding to the current reference time.

804: The data sending device distributes the to-be-transmitted data to the first integral number of electrophysical sub-channels.

For details, reference may be made to step 103.

805: The data sending device performs coding and scrambling on the to-be-transmitted data through the first integral number of electrophysical sub-channels on the physical layer.

Specifically, reference may be made to step 104, and the details are not described herein again.

806: The data sending device sends, through the second integral number of photophysical sub-channels on the physical layer, the to-be-transmitted data processed by the first integral number of electrophysical sub-channels.

Specifically, reference may be made to step 105, and the details are not described herein again.

807: The data receiving device updates the first integral number, and adjusts the state of the electrophysical sub-channel.

Specifically, the data receiving device receives the sleep indication information through at least one electrophysical sub-channel, where the at least one electrophysical sub-channel is in the active state; switches the state of the at least one electrophysical sub-channel to the sleep state; and updates the first integral number.

Alternatively, the data receiving device receives the activation indication information through at least one electrophysical sub-channel, where the at least one electrophysical sub-channel is in the sleep state; switches the state of the at least one electrophysical sub-channel to the active state, and returns the activation response information through the at least one electrophysical sub-channel; and updates the first integral number.

It should be noted that when the data receiving side of the electrophysical sub-channel is in the sleep state, the data receiving side of the electrophysical sub-channel can receive indication information, for example, the sleep indication information or the activation indication information, but cannot receive data information.

After receiving the sleep indication information through the at least one electrophysical sub-channel in the active state at the data receiving side, the data receiving device switches the state of the data receiving side of the electrophysical sub-channel receiving the sleep indication information from the active state to the sleep state, and deletes the at least one electrophysical sub-channel receiving the sleep indication information from the first integral number of electrophysical sub-channels in the active state at the data receiving side, so as to update the first integral number, as shown in FIG. 11.

Alternatively, the data receiving device receives the activation indication information through the at least one electrophysical sub-channel in the sleep state at the data receiving side, switches the state of the data receiving side of the at least one electrophysical sub-channel receiving the activation indication information from the sleep state to the active state, and returns the activation response information to the data sending device through an electrophysical sub-channel in a direction opposite to the at least one electrophysical sub-channel receiving the activation indication information, as shown in FIG. 12.

Optionally, the sleep indication information includes LPI information, the activation indication information includes IDLE information, and the activation response information includes IDLE-RCK information.

808: The data receiving device receives, through the second integral number of photophysical sub-channels, the to-be-transmitted data sent by the data sending device.

809: The data receiving device receives, through the first integral number of electrophysical sub-channels, the to-be-transmitted data received by the second integral number of photophysical sub-channels.

Specifically, the first integral number of electrophysical sub-channels separately perform synchronization on the to-be-transmitted data received by the second integral number of photophysical sub-channels; and separately perform descrambling and decoding on the to-be-transmitted data on which the synchronization has been performed. Reference may be made to step 701, and the details are not described herein again.

Further, the second integral number may be equal to the first integral number. The second integral number may also be smaller than the first integral number, and in that case, the first integral number is an integral multiple of the second integral number.

810: The data receiving device aggregates, according to a time mark carried in each data frame in the received to-be-transmitted data, the to-be-transmitted data received by the first integral number of electrophysical sub-channels into a data flow.

Specifically, reference may be made to step 702, and the details are not described herein again.

The embodiment of the present invention provides a method for transmitting data in the Ethernet, where to-be-transmitted data is distributed to a first integral number of electrophysical sub-channels, and after coding and scrambling are performed on the to-be-transmitted data through the electrophysical sub-channels, a first integral number of pieces of to-be-transmitted data are transmitted through a second integral number of photophysical sub-channels. In this way, the to-be-transmitted data is transmitted through multiple electrophysical sub-channels and photophysical sub-channels; and when a data rate is increased, electrophysical sub-channels can be added so that the to-be-transmitted data is distributed to the added electrophysical sub-channels for transmission. It is unnecessary to increase a bit width corresponding to each electrophysical sub-channel and it is also unnecessary to increase the number of virtual channels corresponding to each electrophysical sub-channel. As a result, an objective of reducing the complexity of data processing while meeting high-rate data transmission is achieved. Moreover, by changing in real time, according to a data amount of the to-be-transmitted data, the number of the electrophysical sub-channels configured to transmit the to-be-transmitted data, a bandwidth of a physical interface of the high-speed Ethernet can be adjusted flexibly, which achieves effective resource utilization and energy saving.

Figure 13:
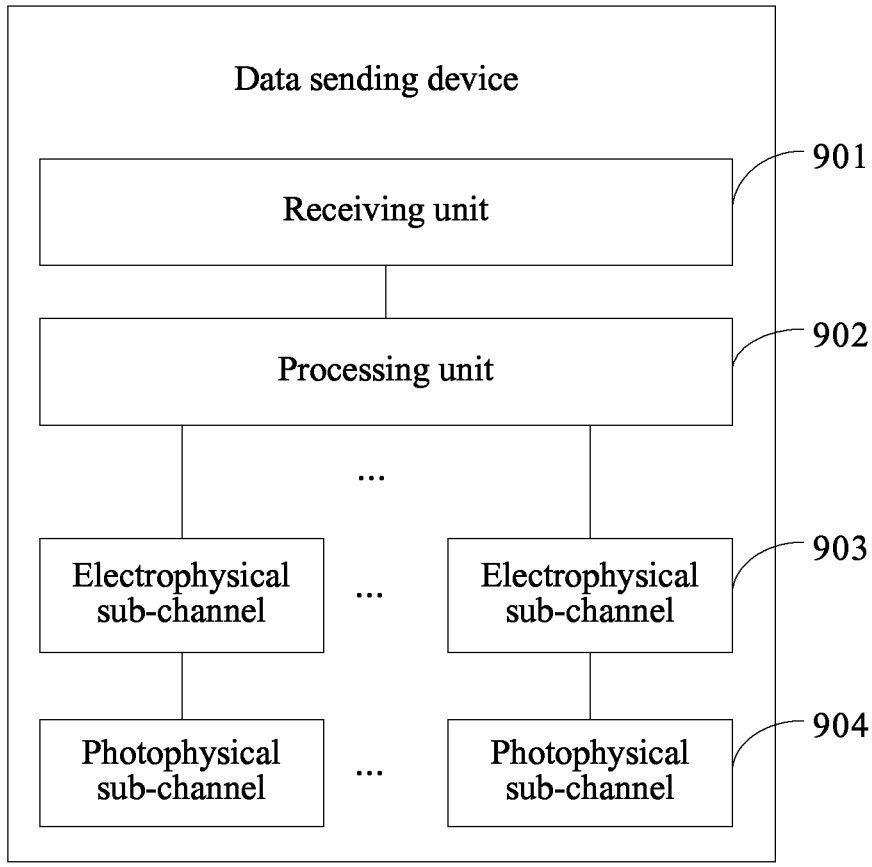
FIG. 13 is a schematic diagram of functional blocks of a data sending device according to an embodiment of the present invention.

An embodiment of the present invention provides a data sending device. As shown in FIG. 13, the device includes: a receiving unit 901, a processing unit 902, an electrophysical sub-channel 903, and a photophysical sub-channel 904:

The receiving unit 901 is configured to receive to-be-transmitted data.

Specifically, the receiving unit 901 may receive, on an RS (Reconciliation Sublayer, reconciliation sublayer) in the Ethernet, to-be-transmitted data transmitted from a data link layer.

Alternatively, the receiving unit 901 may receive, on a network layer, to-be-transmitted data from a layer above the network layer.

The processing unit 902 is configured to determine a first integral number according to a data amount of the received to-be-transmitted data and a transmission bandwidth of the electrophysical sub-channel 903.

The first integral number is the number of electrophysical sub-channels that are on a physical layer and configured to transmit the to-be-transmitted data. The electrophysical sub-channel is configured to implement a function of a physical coding sublayer PCS in the Ethernet. The first integral number is greater than zero.

Specifically, the processing unit 902 is specifically configured to determine, on the RS, the first integral number according to the data amount of the received to-be-transmitted data and the transmission bandwidth of the electrophysical sub-channel 903.

Alternatively, the processing unit 902 is specifically configured to determine, on the network layer, the first integral number according to the data amount of the received to-be-transmitted data and the transmission bandwidth of the electrophysical sub-channel 903.

Further, that the processing unit 902 is configured to determine a first integral number according to a data amount of the received to-be-transmitted data and a transmission bandwidth of the electrophysical sub-channel 903 specifically includes: calculating a data amount of to-be-transmitted data received in a previous reference time; and determining a first integral number corresponding to a current reference time according to the calculated data amount of the to-be-transmitted data received in the previous reference time and the transmission bandwidth of the electrophysical sub-channel 903. In the present invention, the data sending device has N (N is an integer greater than 1) electrophysical sub-channels 903 which can work in parallel, and determines, according to the data amount of the to-be-transmitted data and the bandwidth of each electrophysical sub-channel 903, selection of a matched number of the electrophysical sub-channels 903 from the N electrophysical sub-channels to transmit the to-be-transmitted data.

The reference time refers to a time period in which the data amount of the received to-be-transmitted data is calculated, and the reference time may be preset. In an application scenario, the reference time may be the same as the time in which the to-be-transmitted data received in the reference time is distributed to a first integral number of electrophysical sub-channels.

The processing unit 902 is further configured to distribute the to-be-transmitted data to the first integral number of electrophysical sub-channels.

Specifically, the processing unit 902 is specifically configured to divide, on the network layer, the to-be-transmitted data into a first integral number of pieces of to-be-transmitted data, and transmit the first integral number of pieces of to-be-transmitted data to the first integral number of electrophysical sub-channels 903 on a physical layer through a data link layer and an RS.

Alternatively, the processing unit 902 is specifically configured to distribute, on the RS, the to-be-transmitted data to the first integral number of electrophysical sub-channels 903.

Specifically, that the processing unit 902 is specifically configured to distribute, on the RS, the to-be-transmitted data to the first integral number of electrophysical sub-channels 903 includes: distributing, based on a distribution period, the to-be-transmitted data in a unit of data frame to the first integral number of electrophysical sub-channels 903 in a polling manner.

When the to-be-transmitted data is distributed in a unit of data frame to the first integral number of electrophysical sub-channels 903, a time mark used to indicate a distribution sequence is added into the data frame according to the distribution sequence.

Further, a time mark is added into a preamble field of the data frame.

Further, that the processing unit 902 is specifically configured to distribute, based on a distribution period, the to-be-transmitted data in a unit of a data frame to the first integral number of electrophysical sub-channels 903 in a polling manner includes: in one distribution period, distributing the to-be-transmitted data in a unit of data frame to one electrophysical sub-channel 903, until the distribution period ends; and in a next distribution period, distributing the to-be-transmitted data in a unit of data frame to a next electrophysical sub-channel 903.

When the distribution period ends, a switching mark is added into the last data frame distributed to the electrophysical sub-channel 903. The switching mark is used to identify that a next data frame of a current data frame is distributed to a next electrophysical sub-channel 903.

Further, a switching mark is added into a preamble field of the last data frame distributed to the electrophysical sub-channel.

Optionally, a timestamp field and a switching field are defined in the preamble field of the data frame. A time sequence of the data frame distribution may be recorded according to the timestamp field. That is, the time mark is specifically a timestamp. Content of the switching field may be used to indicate whether a next data frame belongs to a current electrophysical sub-channel. At a receiving side, it may be determined, according to the content of the switching field, whether switching is needed when the data frame is read. Optionally, if the obtained switching field is 0x55, it indicates that the next data frame of the current data frame belongs to the current electrophysical sub-channel. If the obtained switching field is 0xaa, it indicates that the next data frame of the current data frame does not belong to the current electrophysical sub-channel. That is, the next data frame of the current data frame belongs to the next electrophysical sub-channel.

The electrophysical sub-channel 903 is configured to perform coding and scrambling on the to-be-transmitted data, and send the to-be-transmitted data on which the coding and scrambling have been performed to a second integral number of photophysical sub-channels. The coding performed by the electrophysical sub-channel both refers to coding in the PCS, for example, 8B/10B coding, 64B/66B coding, and the like.

The second integral number is greater than zero.

Further, the first integral number is an integral multiple of the second integral number. The first integral number may be equal to the second integral number, and in that case, the electrophysical sub-channels corresponds to the photophysical sub-channels in a one-to-one manner. The first integral number may be unequal to the second integral number, the first integral number is an integral multiple of the second integral number, and multiple electrophysical sub-channels are multiplexed into one photophysical sub-channel for data transmission.

The photophysical sub-channel 904 is configured to send after processing data from the first integral number of electrophysical sub-channels 903.

Further, the processing unit 902 is further configured to detect whether a first integral number corresponding to the previous reference time is equal to the first integral number corresponding to the current reference time; and if the first integral number corresponding to the previous reference time is unequal to the first integral number corresponding to the current reference time, determine at least one to-be-adjusted electrophysical sub-channel, adjust a state of the at least one to-be-adjusted electrophysical sub-channel, and determine the first integral number of electrophysical sub-channels 903 corresponding to the current reference time; if the first integral number corresponding to the previous reference time is equal to the first integral number corresponding to the current reference time, determine a first integral number of electrophysical sub-channels which are on the physical layer and correspond to the previous reference time as the first integral number of electrophysical sub-channels 903 corresponding to the current reference time.

Specifically, that the processing unit 902 is specifically configured to: if the first integral number corresponding to the previous reference time is unequal to the first integral number corresponding to the current reference time, determine at least one to-be-adjusted electrophysical sub-channel, adjust a state of the at least one to-be-adjusted electrophysical sub-channel, and determine the first integral number of electrophysical sub-channels 903 corresponding to the current reference time, specifically includes:

if the first integral number corresponding to the current reference time is smaller than the first integral number corresponding to the previous reference time, determining a third integral number of first to-be-adjusted electrophysical sub-channels, and sending sleep indication information through the third integral number of first to-be-adjusted electrophysical sub-channels; switching states of the third integral number of first to-be-adjusted electrophysical sub-channels to a sleep state; and determining electrophysical sub-channels currently in the active state as the first integral number of electrophysical sub-channels corresponding to the current reference time, where the third integral number is a difference between the first integral number corresponding to the previous reference time and the first integral number corresponding to the current reference time; and if the first integral number corresponding to the current reference time is greater than the first integral number corresponding to the previous reference time, determining a fourth integral number of second to-be-adjusted electrophysical sub-channels, and sending activation indication information through the fourth integral number of second to-be-adjusted electrophysical sub-channels; switching states of the fourth integral number of second to-be-adjusted electrophysical sub-channels to an active state; and receiving activation response information returned, and determining the electrophysical sub-channels currently in the active state as the first integral number of electrophysical sub-channels corresponding to the current reference time, where the fourth integral number is a difference between the first integral number corresponding to the current reference time and the first integral number corresponding to the previous reference time.

In this case, that the processing unit 902 is configured to distribute the to-be-transmitted data to the first integral number of electrophysical sub-channels specifically includes: distributing the to-be-transmitted data to the determined first integral number of electrophysical sub-channels corresponding to the current reference time.

Optionally, the reference time may include a first integral number of distribution periods.

Optionally, the sleep indication information includes LPI information, the activation indication information includes IDLE information, and the activation response information includes IDLE-RCK information.

Further, the electrophysical sub-channel 903 is further configured to perform forward error correction FEC check and coding on the to-be-transmitted data.

The photophysical sub-channel 904 is specifically configured to perform physical medium attachment on the to-be-transmitted data processed by the first integral number of electrophysical sub-channels 903, and transmit the to-be-transmitted data through a physical medium channel.

The embodiment of the present invention provides a data sending device, and the data sending device distributes to-be-transmitted data to a first integral number of electrophysical sub-channels, where the to-be-transmitted data is coded and scrambled through the electrophysical sub-channels, and then a first integral number of pieces of to-be-transmitted data are transmitted through a second integral number of photophysical sub-channels. In this way, the to-be-transmitted data is transmitted through multiple electrophysical sub-channels and photophysical sub-channels; and when a data rate is increased, electrophysical sub-channels can be added so that the to-be-transmitted data is distributed to the added electrophysical sub-channels for transmission. It is unnecessary to increase a bit width corresponding to each electrophysical sub-channel and it is also unnecessary to increase the number of virtual channels corresponding to each electrophysical sub-channel. As a result, an objective of reducing the complexity of data processing while meeting high-rate data transmission is achieved. Moreover, by changing in real time, according to a data amount of the to-be-transmitted data, the number of the electrophysical sub-channels configured to transmit the to-be-transmitted data, a bandwidth of a physical interface of the high-speed Ethernet can be adjusted flexibly, which achieves effective resource utilization and energy saving.

Figure 14:
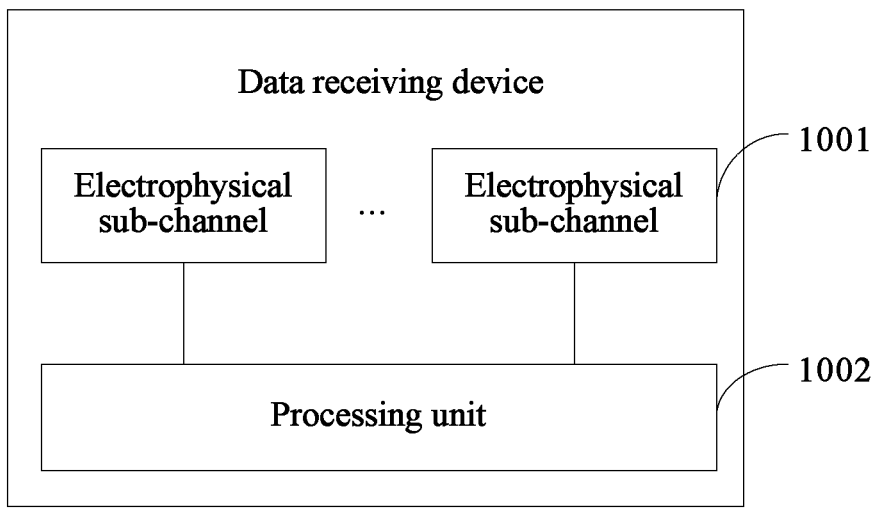
FIG. 14 is a schematic diagram of function blocks of a data receiving device according to an embodiment of the present invention.

An embodiment of the present invention provides a data receiving device. As shown in FIG. 14, the device includes:

a first integral number of electrophysical sub-channels 1001 in a plurality of electrophysical sub-channels 1001, configured to receive to-be-transmitted data sent by a data sending device, where the data sent by the sending device is data generated after to-be-transmitted data of a sending end is distributed to a first integral number of electrophysical sub-channels in the data sending device and is processed by the first integral number of electrophysical sub-channels in the data sending device, the first integral number is greater than zero, and the first integral number is determined based on a data amount of the to-be-transmitted data and a bandwidth of the electrophysical sub-channel in the data sending device; and a processing unit 1002, configured to aggregate, according to a time mark carried in each data frame in the received data, the data received by the first integral number of electrophysical sub-channels 1001 into a data flow.

The processing unit 1002 is specifically configured to read one data frame from one electrophysical sub-channel 1001; insert, according to the time mark carried in the data frame, the data frame into a position corresponding to the time mark in the data flow; and detect whether the data frame carries a switching mark; and if the data frame does not carry the switching mark, read a next data frame from the electrophysical sub-channel 1001; if the data frame carries the switching mark, read a next data frame from a next electrophysical sub-channel of the electrophysical sub-channel 1001, until all data frames are read.

The time mark is used to indicate a distribution sequence of the data frames.

Further, a time mark is obtained from a preamble field of the data frame, and a switching mark is obtained from a preamble field of the last data frame distributed to the electrophysical sub-channel.

Optionally, a timestamp field and a switching field are defined in the preamble field of the data frame. A time sequence of the data frame distribution may be recorded according to the timestamp field. That is, the time mark is specifically a timestamp. Content of the switching field may be used to indicate whether a next data frame belongs to a current electrophysical sub-channel. At a receiving side, it may be determined, according to the content of the switching field, whether switching is needed when the data frame is read. Optionally, if the obtained switching field is 0x55, it indicates that the next data frame of the current data frame belongs to the current electrophysical sub-channel. If the obtained switching field is 0xaa, it indicates that the next data frame of the current data frame does not belong to the current electrophysical sub-channel. That is, the next data frame of the current data frame belongs to the next electrophysical sub-channel.

Further, if the time mark is obtained from the preamble field of the data frame, after the time mark of the data frame is obtained and after the data frame is inserted into a corresponding position of the time mark in the data flow, the time mark is modified into 0x55555555.

When it is detected whether the data frame carries the switching mark, if it is detected that the switching field of the preamble field of the data frame is 0xaa, it indicates that the next data frame is obtained from the next electrophysical sub-channel. In this case, when the data frame is obtained by switching to the next electrophysical sub-channel, the switching field of the preamble field of the data frame is modified into 0x55.

Figure 15:
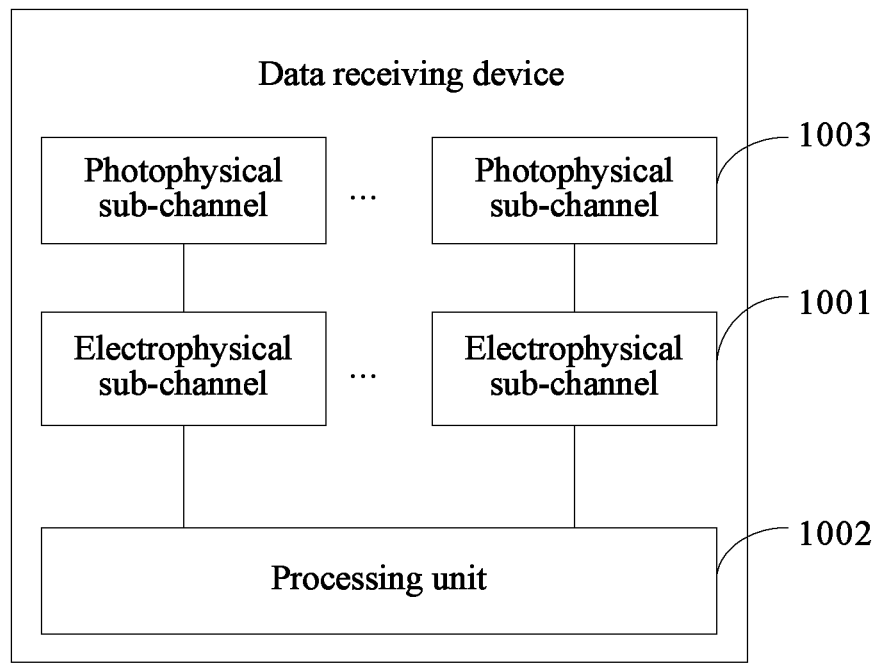
FIG. 15 is a schematic diagram of function blocks of another data receiving device according to an embodiment of the present invention.

As shown in FIG. 15, the data receiving device further includes:

a second integral number of photophysical sub-channels 1003 in a plurality of photophysical sub-channels 1003, configured to receive the to-be-transmitted data sent by the data sending device, and transmit the data to the first integral number of electrophysical sub-channels 1001.

In this case, the first integral number of electrophysical sub-channels 1001 in the plurality of the electrophysical sub-channels 1001 are specifically configured to perform synchronization on the data transmitted by the second integral number of photophysical sub-channels 1003, and perform descrambling and decoding on the to-be-transmitted data on which the synchronization has been performed.

Further, before at least one electrophysical sub-channel in the plurality of the electrophysical sub-channels 1001 receives the to-be-transmitted data sent by the data sending device, the at least one electrophysical sub-channel 1001 in the plurality of the electrophysical sub-channels 1001 is further configured to receive sleep indication information.

The at least one electrophysical sub-channel 1001 in the plurality of electrophysical sub-channels 1001 is in an active state.

The processing unit 1002 is further configured to switch a state of the at least one electrophysical sub-channel 1001, which is in the plurality of the electrophysical sub-channels 1001 and receives the sleep indication information, to a sleep state; and update the first integral number.

Further, the at least one electrophysical sub-channel 1001 in the plurality of the electrophysical sub-channels 1001 is further configured to receive activation indication information.

The at least one electrophysical sub-channel in the plurality of the electrophysical sub-channels 1001 is in a sleep state.

The processing unit 1002 is further configured to switch the state of the at least one electrophysical sub-channel 1001, which is in the plurality of the electrophysical sub-channels 1001 and receives the activation indication information, to an active state, and return activation response information through the at least one electrophysical sub-channel 1001 in the plurality of the electrophysical sub-channels 1001; and update the first integral number.

Optionally, the sleep indication information includes LPI information, the activation indication information includes IDLE information, and the activation response information includes IDLE-RCK information.

The embodiment of the present invention provides a data receiving device, and the data receiving device receives to-be-transmitted data sent by a data sending device through a first integral number of electrophysical sub-channels, and aggregates, according to a time mark of the to-be-transmitted data, the received to-be-transmitted data into a data flow. In this way, the data sending device sends the to-be-transmitted data to the data receiving device through the first integral number of electrophysical sub-channels, so that the to-be-transmitted data is transmitted through multiple electrophysical sub-channels and photophysical sub-channels; and when a data rate is increased, electrophysical sub-channels can be added so that the to-be-transmitted data is distributed to the added electrophysical sub-channels for transmission. It is unnecessary to increase a bit width corresponding to each electrophysical sub-channel and it is also unnecessary to increase the number of virtual channels corresponding to each electrophysical sub-channel. As a result, an objective of reducing the complexity of data processing while meeting high-rate data transmission is achieved.

Figure 16:
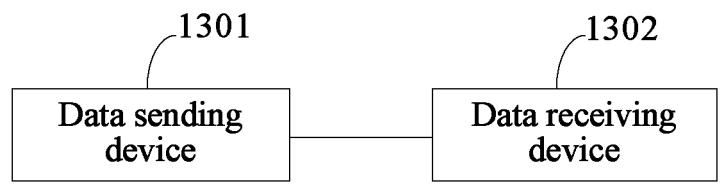
FIG. 16 is a schematic diagram of a system for transmitting data in the Ethernet according to an embodiment of the present invention.

An embodiment of the present invention provides a system for transmitting data in the Ethernet. As shown in FIG. 16, the system includes a data sending device 1301 and a data receiving device 1302. The data sending device 1301 is the data sending device according to the foregoing embodiments, and the data receiving device 1302 is the data receiving device according to the foregoing embodiments.

The embodiments of the present invention provide a method, an apparatus, and a system for transmitting data in the Ethernet, in which to-be-transmitted data is distributed to a first integral number of electrophysical sub-channels, where the to-be-transmitted data is coded and scrambled through the electrophysical sub-channels, and then a first integral number of pieces of to-be-transmitted data are transmitted through a second integral number of photophysical sub-channels. In this way, the to-be-transmitted data is transmitted through multiple electrophysical sub-channels and photophysical sub-channels; and when a data rate is increased, electrophysical sub-channels can be added so that the to-be-transmitted data is distributed to the added electrophysical sub-channels for transmission. It is unnecessary to increase a bit width corresponding to each electrophysical sub-channel and it is also unnecessary to increase the number of virtual channels corresponding to each electrophysical sub-channel. As a result, an objective of reducing the complexity of data processing while meeting high-rate data transmission is achieved. Moreover, by changing in real time, according to a data amount of the to-be-transmitted data, the number of the electrophysical sub-channels configured to transmit the to-be-transmitted data, a bandwidth of a physical interface of the high-speed Ethernet can be adjusted flexibly, which achieves effective resource utilization and energy saving.

The foregoing descriptions are merely specific embodiments of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method for transmitting data in the Ethernet, comprising:

receiving to-be-transmitted data;

determining a first integral number according to a data amount of the received to-be-transmitted data and a transmission bandwidth of an electrophysical sub-channel, the first integral number is the number of electrophysical sub-channels configured to transmit the to-be-transmitted data, the electrophysical sub-channel is configured to implement a function of a physical coding sublayer (PCS) in the Ethernet, and the first integral number is greater than zero;

distributing the to-be-transmitted data to the first integral number of electrophysical sub-channels;

performing, by each of the first integral number of electrophysical sub-channels, based on a function requirement of the physical coding sublayer PCS in the Ethernet, coding and scrambling processing on the to-be-transmitted data, the coding is performed in parallel by each of the first integral number of electrophysical sub-channels; and sending after processing, by a second integral number of photophysical sub-channels, data from the first integral number of electrophysical sub-channels, the photophysical sub-channel is configured to implement a function of a physical medium attachment sublayer (PMA) in the Ethernet and a function of a physical medium dependent sublayer PMD in the Ethernet, and the second integral number is greater than zero.

2. The method according to claim 1, wherein the receiving to-be-transmitted data comprises:

receiving, by a reconciliation sublayer RS in the Ethernet, to-be-transmitted data transmitted from a data link layer;

the determining a first integral number according to a data amount of the received to-be-transmitted data and a transmission bandwidth of an electrophysical sub-channel comprises:

determining, by the RS, the first integral number according to the data amount of the received to-be-transmitted data and the transmission bandwidth of the electrophysical sub-channel; and the distributing the to-be-transmitted data to the first integral number of electrophysical sub-channels comprises:

distributing, by the RS, the to-be-transmitted data to the first integral number of electrophysical sub-channels.

3. The method according to claim 2, wherein the distributing the to-be-transmitted data to the first integral number of electrophysical sub-channels comprises:

distributing, based on a distribution period, the to-be-transmitted data in a unit of data frame to the first integral number of electrophysical sub-channels in a polling manner, wherein when the to-be-transmitted data is distributed in a unit of data frame to the first integral number of electrophysical sub-channels, a time mark used to indicate a distribution sequence is added into the data frame according to the distribution sequence.

4. The method according to claim 3, wherein the distributing, based on a distribution period, the to-be-transmitted data in a unit of data frame to the first integral number of electrophysical sub-channels in a polling manner comprises:
in one distribution period, distributing the to-be-transmitted data in a unit of data frame to one electrophysical sub-channel, until the distribution period ends; and in a next distribution period, distributing the to-be-transmitted data in a unit of data frame to a next electrophysical sub-channel, wherein when the distribution period ends, a switching mark is added into the last data frame distributed to the electrophysical sub-channel, wherein the switching mark is used to identify that a next data frame of a current data frame is distributed to a next electrophysical sub-channel.

5. The method according to claim 4, wherein the adding a switching mark into the last data frame distributed to the electrophysical sub-channel comprises:
adding a switching mark into a preamble field of the last data frame distributed to each electrophysical sub-channel.

6. The method according to claim 3, wherein the adding a time mark used to indicate a distribution sequence into the data frame comprises: adding the time mark into the preamble field of the data frame.

7. The method according to claim 1, wherein the receiving to-be-transmitted data comprises:
receiving, by a network layer, the to-be-transmitted data;
the determining a first integral number according to a data amount of the received to-be-transmitted data and a transmission bandwidth of an electrophysical sub-channel comprises:
determining, by the network layer, the first integral number according to the data amount of the received to-be-transmitted data and the transmission bandwidth of the electrophysical sub-channel; and
the distributing the to-be-transmitted data to the first integral number of electrophysical sub-channels comprises:
dividing, by the network layer, the to-be-transmitted data into a first integral number of pieces of to-be-transmitted data, and transmitting the first integral number of pieces of to-be-transmitted data to the first integral number of electrophysical sub-channels on a physical layer through a data link layer and an RS layer.

8. The method according to claim 1, wherein:
the determining a first integral number according to a data amount of the received to-be-transmitted data and a transmission bandwidth of an electrophysical sub-channel comprises:
calculating a data amount of to-be-transmitted data received in a previous reference time, wherein the reference time is a preset time period in which the data amount of the to-be-transmitted data is calculated; and
determining a first integral number corresponding to a current reference time according to the calculated data amount of the to-be-transmitted data received in the previous reference time and the transmission bandwidth of the electrophysical sub-channel;
before the distributing the to-be-transmitted data to the first integral number of electrophysical sub-channels, the method further comprises:

detecting whether a first integral number corresponding to the previous reference time is equal to the first integral number corresponding to the current reference time; and
when the first integral number corresponding to the previous reference time is unequal to the first integral number corresponding to the current reference time, determining at least one to-be-adjusted electrophysical sub-channel, adjusting a state of the at least one to-be-adjusted electrophysical sub-channel, and determining a first integral number of electrophysical sub-channels corresponding to the current reference time; and
when the first integral number corresponding to the previous reference time is equal to the first integral number corresponding to the current reference time, determining a first integral number of electrophysical sub-channels which are on the physical layer and correspond to the previous reference time as a first integral number of electrophysical sub-channels corresponding to the current reference time; and
the distributing the to-be-transmitted data to the first integral number of electrophysical sub-channels comprises:
distributing the to-be-transmitted data to the determined first integral number of electrophysical sub-channels corresponding to the current reference time.

9. The method according to claim 8, wherein when the first integral number corresponding to the previous reference time is unequal to the first integral number corresponding to the current reference time, determining at least one to-be-adjusted electrophysical sub-channel, adjusting a state of the at least one to-be-adjusted electrophysical sub-channel, and determining a first integral number of electrophysical sub-channels corresponding to the current reference time comprises:
when the first integral number corresponding to the current reference time is smaller than the first integral number corresponding to the previous reference time, determining a third integral number of first to-be-adjusted electrophysical sub-channels, wherein the first to-be-adjusted electrophysical sub-channels are electrophysical sub-channels in an active state; switching states of the third integral number of first to-be-adjusted electrophysical sub-channels from the active state to a sleep state; and determining electrophysical sub-channels currently in the active state as the first integral number of electrophysical sub-channels corresponding to the current reference time, wherein the third integral number is a difference between the first integral number corresponding to the previous reference time and the first integral number corresponding to the current reference time; and
when the first integral number corresponding to the current reference time is greater than the first integral number corresponding to the previous reference time, determining a fourth integral number of second to-be-adjusted electrophysical sub-channels, wherein the second to-be-adjusted electrophysical sub-channels are electrophysical sub-channels in the sleep state; switching states of the fourth integral number of second to-be-adjusted electrophysical sub-channels from the sleep state to the active state; and determining electrophysical sub-channels currently in the active state as the first integral number of electrophysical sub-channels corresponding to the current reference time, wherein the fourth integral number is a difference between the first integral number corresponding to the current reference time and the first integral number corresponding to the previous reference time.

10. The method according to claim 9, wherein the switching states of the third integral number of first to-be-adjusted electrophysical sub-channels from the active state to the sleep state comprises:
sending sleep indication information through the third integral number of first to-be-adjusted electrophysical sub-channels, and triggering switching of the states of the third integral number of first to-be-adjusted electrophysical sub-channels from the active state to the sleep state; and
the switching states of the fourth integral number of second to-be-adjusted electrophysical sub-channels from the sleep state to the active state comprises:
sending activation indication information through the fourth integral number of second to-be-adjusted electrophysical sub-channels, and triggering switching of the states of the fourth integral number of second to-be-adjusted electrophysical sub-channels from the sleep state to the active state.

11. The method according to claim 1, wherein before the performing, by the first integral number of electrophysical sub-channels, coding and scrambling processing on the to-be-transmitted data, and before the sending before processing, by the second integral number of photophysical sub-channels, data from the first integral number of electrophysical sub-channels, the method further comprises:
performing, by the first integral number of electrophysical sub-channels, forward error correction FEC check and coding processing on the to-be-transmitted data; and
the sending before processing, by the second integral number of photophysical sub-channels, data from the first integral number of electrophysical sub-channels comprises:
performing, by the second integral number of photophysical sub-channels, physical medium attachment processing on the to-be-transmitted data processed by the first integral number of electrophysical sub-channels, and sending the to-be-transmitted data through a physical medium channel.

12. The method for transmitting data in the Ethernet according to claim 1, further comprising:
receiving in a data receiving device, through the first integral number of electrophysical sub-channels, data sent by a data sending device, wherein the data sent by the sending device is data generated after the to-be-transmitted data of a sending end is distributed to the first integral number of electrophysical sub-channels in the data sending device and is processed by the first integral number of electrophysical sub-channels in the data sending device, and the first integral number is determined based on a data amount of the to-be-transmitted data and a bandwidth of the electrophysical sub-channel in the data sending device; and
aggregating, according to a time mark carried in each data frame in the received data, the data received by the first integral number of electrophysical sub-channels in the data receiving device into a data flow.

13. The method according to claim 12, wherein the aggregating, according to a time mark carried in each data frame in the received data, the data received by the first integral number of electrophysical sub-channels in the data receiving device into a data flow comprises:
reading one data frame from one electrophysical sub-channel; inserting, according to the time mark carried in the data frame, the data frame into a position corresponding to the time mark in the data flow; and detecting whether the data frame carries a switching mark; and when the data frame does not carry the switching mark, reading a next data frame from the electrophysical sub-channel; when the data frame carries the switching mark, reading a next data frame from a next electrophysical sub-channel of the electrophysical sub-channel, until all data frames are read.

14. The method according to claim 12, wherein before the receiving in a data receiving device, through a first integral number of electrophysical sub-channels, data sent by a data sending device, the method further comprises:
receiving, through a second integral number of photophysical sub-channels, the data sent by the data sending device, wherein the second integral number is greater than zero; and
the receiving in a data receiving device, through a first integral number of electrophysical sub-channels, data sent by a data sending device comprises:
separately performing, by the first integral number of electrophysical sub-channels, synchronization processing on the data received by the second integral number of photophysical sub-channels; and separately performing descrambling and decoding processing on the data on which the synchronization processing has been performed.

15. The method according to claim 12, further comprising:
receiving sleep indication information through at least one electrophysical sub-channel, wherein the at least one electrophysical sub-channel is in an active state; and
switching a state of the at least one electrophysical sub-channel receiving the sleep indication information to a sleep state; and updating the first integral number; or
receiving activation indication information through the at least one electrophysical sub-channel, wherein the at least one electrophysical sub-channel is in the sleep state; and
switching a state of the at least one electrophysical sub-channel that receives the activation indication information to the active state, and returning activation response information through the at least one electrophysical sub-channel; and updating the first integral number.

16. A data sending device, comprising:
a memory to store instructions;
a processor to execute the instructions to configure the data sending device to:
receive to-be-transmitted data;
determine a first integral number according to a data amount of the received to-be-transmitted data and a transmission bandwidth of an electrophysical sub-channel, the first integral number is the number of electrophysical sub-channels which are on a physical layer and configured to transmit the to-be-transmitted data, the electrophysical sub-channel is configured to implement a function of a physical coding sublayer PCS in the Ethernet, and the first integral number is greater than zero;
distribute the to-be-transmitted data to the first integral number of electrophysical sub-channels,
each of the electrophysical sub-channels is configured to perform coding and scrambling on the to-be-transmitted data, and to send the to-be-transmitted data on which the coding and scrambling have been performed to a second integral number of photophysical sub-channels, the second integral number is greater than zero, the coding is performed in parallel by each of the first integral number of electrophysical sub-channels; and a photophysical sub-channel, configured to send after processing data from the first integral number of electrophysical sub-channels.

17. The device according to claim 16, wherein the processor further executes the instructions to configure the data sending device to:

receive, on a reconciliation sublayer RS in the Ethernet, to-be-transmitted data transmitted from a data link layer;

determine, on the RS, the first integral number according to the data amount of the received to-be-transmitted data and the transmission bandwidth of the electrophysical sub-channel; and distribute, on the RS, the to-be-transmitted data to the first integral number of electrophysical sub-channels.

18. The device according to claim 16, wherein the processor further executes the instructions to configure the data sending device to distribute, based on a distribution period, the to-be-transmitted data in a unit of data frame to the first integral number of electrophysical sub-channels in a polling manner, wherein when the to-be-transmitted data is distributed in a unit of data frame to the first integral number of electrophysical sub-channels, a time mark used to indicate a distribution sequence is added into the data frame according to the distribution sequence.

19. The device according to claim 18, wherein the processor further executes the instructions to configure the data sending device to:

in one distribution period, distribute the to-be-transmitted data in a unit of data frame to one electrophysical sub-channel, until the distribution period ends; and in a next distribution period, distribute the to-be-transmitted data in a unit of data frame, to a next electrophysical sub-channel, wherein when the distribution period ends, a switching mark is added into the last data frame distributed to the electrophysical sub-channel, and the switching mark is used to identify that a next data frame of a current data frame is distributed to a next electrophysical sub-channel.

20. The device according to claim 16, wherein the processor further executes the instructions to configure the data sending device to:

receive, on a network layer, the to-be-transmitted data;

determine, on the network layer, the first integral number according to the data amount of the received to-be-transmitted data and the transmission bandwidth of the electrophysical sub-channel; and divide, on the network layer, the to-be-transmitted data into a first integral number of pieces of to-be-transmitted data, and transmit the first integral number of pieces of to-be-transmitted data to the first integral number of electrophysical sub-channels on a physical layer through a data link layer and an RS layer.

21. The device according to claim 16, wherein the processor further executes the instructions to configure the data sending device to:

calculate a data amount of to-be-transmitted data received in a previous reference time, wherein the reference time is a preset time period in which the data amount of the to-be-transmitted data is calculated; and determine a first integral number corresponding to a current reference time according to the calculated data amount of the to-be-transmitted data received in the previous reference time and the transmission bandwidth of the electrophysical sub-channel;

detect whether a first integral number corresponding to the previous reference time is equal to the first integral number corresponding to the current reference time; and when the first integral number corresponding to the previous reference time is unequal to the first integral number corresponding to the current reference time, determine at least one to-be-adjusted electrophysical sub-channel, adjust a state of the at least one to-be-adjusted electrophysical sub-channel, and determine a first integral number of electrophysical sub-channels corresponding to the current reference time; when the first integral number corresponding to the previous reference time is equal to the first integral number corresponding to the current reference time, determine a first integral number of electrophysical sub-channels which are on the physical layer and correspond to the previous reference time as the first integral number of electrophysical sub-channels corresponding to the current reference time; and distribute the to-be-transmitted data to the determined first integral number of electrophysical sub-channels corresponding to the current reference time.

22. The device according to claim 21, wherein the processor further executes the instructions to configure the data sending device to:

when the first integral number corresponding to the current reference time is smaller than the first integral number corresponding to the previous reference time, determine a third integral number of first to-be-adjusted electrophysical sub-channels, wherein the first to-be-adjusted electrophysical sub-channels are electrophysical sub-channels in an active state; switch states of the third integral number of first to-be-adjusted electrophysical sub-channels from the active state to a sleep state; and determine electrophysical sub-channels currently in the active state as the first integral number of electrophysical sub-channels corresponding to the current reference time, wherein the third integral number is a difference between the first integral number corresponding to the previous reference time and the first integral number corresponding to the current reference time; and when the first integral number corresponding to the current reference time is greater than the first integral number corresponding to the previous reference time, determine a fourth integral number of second to-be-adjusted electrophysical sub-channels, wherein the second to-be-adjusted electrophysical sub-channels are electrophysical sub-channels in the sleep state; switching states of the fourth integral number of second to-be-adjusted electrophysical sub-channels from the sleep state to the active state; and determine electrophysical sub-channels currently in the active state as the first integral number of electrophysical sub-channels corresponding to the current reference time, wherein the fourth integral number is a difference between the first integral number corresponding to the current reference time and the first integral number corresponding to the previous reference time.

23. The device according to claim 16, wherein:

the electrophysical sub-channel is further configured to perform forward error correction FEC check and coding processing on the to-be-transmitted data; and the photophysical sub-channel is configured to perform physical medium attachment processing on the to-be-transmitted data processed by the first integral number of electrophysical sub-channels, and send the to-be-transmitted data through a physical medium channel.

24. A system, comprising:
a data sending device, comprising:
a memory to store instructions; and
a processor to execute the instructions to configure the data sending device to:
receive to-be-transmitted data;
determine a first integral number according to a data amount of the received to-be-transmitted data and a transmission bandwidth of an electrophysical sub-channel, the first integral number is the number of electrophysical sub-channels which are on a physical layer and configured to transmit the to-be-transmitted data, the electrophysical sub-channel is configured to implement a function of a physical coding sublayer PCS in the Ethernet, and the first integral number is greater than zero;
distribute the to-be-transmitted data to the first integral number of electrophysical sub-channels,
each of the electrophysical sub-channels is configured to perform coding and scrambling on the to-be-transmitted data, and send the to-be-transmitted data on which the coding and scrambling have been performed to a second integral number of photophysical sub-channels, the second integral number is greater than zero, the coding is performed in parallel by each of the first integral number of electrophysical sub-channels; and
a photophysical sub-channel, configured to send after processing data from the first integral number of electrophysical sub-channels; and
a data receiving device, comprising:
a first integral number of electrophysical sub-channels in a plurality of electrophysical sub-channels, configured to receive data sent by the data sending device, the data sent by the sending device is data generated after the to-be-transmitted data of a sending end is distributed to the first integral number of electrophysical sub-channels in the data sending device and is processed by the first integral number of electrophysical sub-channels in the data sending device, the first integral number is greater than zero, and the first integral number is determined based on a data amount of the to-be-transmitted data and a bandwidth of the electrophysical sub-channel in the data sending device; and
a processor, configured to aggregate, according to a time mark carried in each data frame in the received data, the data received by the first integral number of electrophysical sub-channels into a data flow.

25. The system according to claim 24, wherein
the processor is configured to read one data frame from one electrophysical sub-channel; insert, according to the time mark carried in the data frame, the data frame into a position corresponding to the time mark in the data flow; and detect whether the data frame carries a switching mark; and when the data frame does not carry the switching mark, read a next data frame from the electrophysical sub-channels; when the data frame carries the switching mark, read a next data frame from a next electrophysical sub-channel of the electrophysical sub-channel, until all data frames are read.

26. The system according to claim 24, further comprising:
a second integral number of photophysical sub-channels in a plurality of photophysical sub-channels, configured to receive the data sent by the data sending device, and transmit the data to the first integral number of electrophysical sub-channels, wherein
the first integral number of electrophysical sub-channels in the plurality of electrophysical sub-channels are configured to perform synchronization processing on the data transmitted by the second integral number of photophysical sub-channels, and perform descrambling and decoding processing on the to-be-transmitted data on which the synchronization processing has been performed.

27. The system according to claim 24, wherein:
at least one electrophysical sub-channel in the plurality of electrophysical sub-channels is further configured to receive sleep indication information, and the at least one electrophysical sub-channel in the plurality of electrophysical sub-channels is in an active state; and
the processor is further configured to switch a state of the at least one electrophysical sub-channel, which is in the plurality of electrophysical sub-channels and receives the sleep indication information, to a sleep state; and update the first integral number; or
the at least one electrophysical sub-channel in the plurality of electrophysical sub-channels is further configured to receive activation indication information, and the at least one electrophysical sub-channel in the plurality of electrophysical sub-channels is in the sleep state; and
the processor is further configured to switch a state of the at least one electrophysical sub-channel, which is in the plurality of the electrophysical sub-channels and receives the activation indication information, to the active state, and return activation response information through the at least one electrophysical sub-channel in the plurality of electrophysical sub-channels; and update the first integral number.

* * * * *